US012101343B2

(12) United States Patent
Flysher et al.

(10) Patent No.: US 12,101,343 B2
(45) Date of Patent: Sep. 24, 2024

(54) EVENT-BASED MACHINE LEARNING FOR A TIME-SERIES METRIC

(71) Applicant: Anodot Ltd., Ra'anana (IL)

(72) Inventors: Tsahi Flysher, Ra'anana (IL); Ira Cohen, Reut (IL); Inbal Tadeski, Ra'anana (IL); Meir Toledano, Tel Aviv (IL)

(73) Assignee: Anodot Ltd., Ra'anana (IL)

( * ) Notice: Subject to any disclaimer, the term of this patent is extended or adjusted under 35 U.S.C. 154(b) by 350 days.

(21) Appl. No.: 17/704,313

(22) Filed: Mar. 25, 2022

(65) Prior Publication Data

US 2023/0308461 A1 Sep. 28, 2023

(51) Int. Cl.
*H04L 9/40* (2022.01)
*G06F 18/214* (2023.01)
*H04L 41/16* (2022.01)

(52) U.S. Cl.
CPC ........ *H04L 63/1425* (2013.01); *G06F 18/214* (2023.01); *H04L 41/16* (2013.01)

(58) Field of Classification Search
CPC .... H04L 63/1425; H04L 41/16; G06F 18/214
See application file for complete search history.

(56) References Cited

U.S. PATENT DOCUMENTS

| 11,789,837 | B1* | 10/2023 | Jain | G16H 10/20 |
| | | | | 709/224 |
| 11,853,853 | B1* | 12/2023 | Beauchesne | G06N 20/10 |
| 11,886,475 | B1* | 1/2024 | Swaminathan | G06Q 10/06393 |
| 2016/0147583 | A1* | 5/2016 | Ben Simhon | G06F 11/076 |
| | | | | 714/47.3 |
| 2016/0210556 | A1* | 7/2016 | Ben Simhon | G06N 20/00 |
| 2018/0136994 | A1* | 5/2018 | Toledano | G06F 11/327 |
| 2018/0316707 | A1* | 11/2018 | Dodson | H04L 43/16 |
| 2020/0233774 | A1* | 7/2020 | Toledano | G06F 11/3447 |
| 2021/0149754 | A1* | 5/2021 | Settle | G06F 11/076 |
| 2023/0031767 | A1* | 2/2023 | Bhattacharya | G06Q 10/067 |
| 2023/0135660 | A1* | 5/2023 | Chapman | G06Q 10/063114 |
| | | | | 705/7.38 |
| 2023/0205664 | A1* | 6/2023 | Higginson | G06F 11/3452 |
| | | | | 702/186 |
| 2023/0344841 | A1* | 10/2023 | Tambuluri | G06N 7/01 |
| 2023/0401122 | A1* | 12/2023 | Ciabarra, Jr. | G06F 11/3419 |
| 2023/0412620 | A1* | 12/2023 | Crabtree | H04L 63/1416 |

(Continued)

*Primary Examiner* — Stephen T Gundry
(74) *Attorney, Agent, or Firm* — Miller Johnson

(57) ABSTRACT

A method for generating samples for an anomaly detection system includes receiving events that occurred during a time series of a target metric. Each respective event includes an event attribute characterizing the respective event. The method includes generating a set of event groups for the events. Each event shares a respective attribute with one or more other events of the respective event group. For each respective event group of the set of event groups, the method includes determining an influence pattern that identifies an influence of the respective event group on the target metric. The method includes clustering the set of event groups into event clusters based on a respective influence pattern of each respective event group. Each event cluster includes one or more event groups that share a similar influence pattern. The method includes generating training samples for an anomaly detection system based on a respective event cluster.

18 Claims, 11 Drawing Sheets

(56) References Cited

U.S. PATENT DOCUMENTS

| | | |
|---|---|---|
| 2023/0421593 A1* | 12/2023 | Crabtree ............. H04L 63/1433 |
| 2024/0028830 A1* | 1/2024 | Orhan ................... G06F 40/284 |
| 2024/0061562 A1* | 2/2024 | Abdulaal .............. H04L 41/147 |
| 2024/0078516 A1* | 3/2024 | Zhang ................ G06Q 10/0631 |
| 2024/0119319 A1* | 4/2024 | Fahmy ..................... G06N 5/04 |

\* cited by examiner

EVENT-BASED MACHINE LEARNING FOR A TIME-SERIES METRIC

FIELD

The present disclosure relates to error monitoring in electric digital data processing systems and more particularly to machine-learned performance modeling of time-series metrics.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Modern computing systems can have hundreds or even thousands of processor cores, memory arrays, storage arrays, networking ports, and additional peripherals. In large-scale computing systems such as a data center or supercomputer, the number of processor cores can be in the hundreds of thousands to millions. Each hardware component may have a number of associated parameters such as clock speed, temperature, idle time, etc. Some of these parameters may be reported and/or measured by the computing system itself. Other parameters may be monitored by an associated monitoring system.

These parameters are referred to in this disclosure as metrics and may be defined at a component level, such as available space on a given magnetic disk, or may be at a subsystem level, such as amount of available storage space in a storage area network. Metrics may also be defined at a system level, such as number of transactions per second in a database or delay in returning results for a query. A monitoring system for a large computing system may measure and/or collect thousands, millions, or even billions of time-series metrics (that is, the metrics are measured over time). Monitoring of metrics allows for problems to be quickly identified and resolved, hopefully before affecting business outcomes such as losing users, missing revenue, decreasing productivity, etc.

Currently, problems are detected by skilled system administrators who manually create rules to generate alerts for specific metrics. For example, an administrator may set a threshold for available disk space such that an alert will be generated when available disk space decreases below 10% of total disk space. For many metrics, the "correct" threshold may not be known a priori. Instead, the administrator may have to observe the metric over time and infer a threshold based on the historical metric values.

Administrators may watch scores of metrics, such as in a dashboard, and use experience and intuition to determine if any of the metrics indicate the onset of a problem. However, regardless of the number and size of computer screens, the number of metrics that can be visually tracked is limited.

Further, manually setting rules is a tedious and difficult task. For example, some values of a metric may be associated with problems at some times but with normal operation at others. Sometimes this inconsistency can be resolved by combining metrics. For example, an alert can be defined for when processor utilization is above a first threshold and memory utilization is above a second threshold. However, these thresholds may vary over time and their interrelationship may vary depending on tasks the system is performing. When combining metrics, some relationships may be well understood by the administrator while others are less apparent, escaping the administrator's notice.

Because of the limitations of visual and programmatic oversight by human administrators, big data principles have been applied to the problem of monitoring systems. Automated processes may evaluate every single metric, a significant advance compared to the tiny fraction that a human administrator can review, and determine normal historical behavior for each metric. However, automated processes don't have the insight and experience of an administrator, and therefore this insight generally has to be manually taught to the system.

SUMMARY

This section provides a general summary of the disclosure, and is not a comprehensive disclosure of its full scope or all of its features.

One aspect of the disclosure provides a computerized method for generating samples for an anomaly detection system. The method includes receiving a plurality of events that occurred during a time series of a target metric. Each respective event includes an event attribute characterizing the respective event. The method further includes generating a set of event groups for the plurality of events. Here, each event of a respective event group shares a respective event attribute with one or more other events of the respective event group. For each respective event group of the set of event groups, the method also includes determining an influence pattern that identifies an influence of the respective event group on the target metric. The method additionally includes clustering the set of event groups into event clusters based on a respective influence pattern of each respective event group. Each event cluster includes one or more event groups that share a similar influence pattern. The method further includes generating a plurality of training samples for an anomaly detection system based on a respective event cluster.

In some examples, the method also includes, for each respective event group, generating an impact score for the respective event group and determining that the impact score satisfies a filtering threshold. Here, impact score indicates an amount of influence that the events of the respective group have on the target metric. The filtering threshold indicates an acceptable amount of influence on the target metric for a group event.

In some implementations, for each respective event group, the method includes generating an impact score for the respective event group, determining that the impact score fails to satisfy a filtering threshold, and removing the respective event group from the set of event groups after determining the influence pattern for the respective event group, but prior to clustering the set of event groups into event clusters. Here, impact score indicates an amount of influence that the events of the respective group have on the target metric. The filtering threshold indicates an acceptable amount of influence on the target metric for a group event.

In some configurations, for each respective event group, the method includes generating an impact score for the respective event group, determining that the impact score fails to satisfy a filtering threshold, and removing the respective event group from the set of event groups after determining the influence pattern for the respective event group, but prior to determining the influence pattern for the respective event group. Here, impact score indicates an amount of influence that the events of the respective group have on the target metric. The filtering threshold indicates an acceptable amount of influence on the target metric for a group event.

Another aspect of the disclosure provides a system for generating samples for an anomaly detection system. The system includes processor hardware and memory hardware in communication with the processor hardware. The memory hardware stores instructions that, when executed by the processor hardware, perform operations. The operations include receiving a plurality of events that occurred during a time series of a target metric. Each respective event includes an event attribute characterizing the respective event. The operations further include generating a set of event groups for the plurality of events. Here, each event of a respective event group shares a respective event attribute with one or more other events of the respective event group. For each respective event group of the set of event groups, the operations also include determining an influence pattern that identifies an influence of the respective event group on the target metric. The operations additionally include clustering the set of event groups into event clusters based on a respective influence pattern of each respective event group. Each event cluster includes one or more event groups that share a similar influence pattern. The operations further include generating a plurality of training samples for an anomaly detection system based on a respective event cluster.

In some examples, the operations also include, for each respective event group, generating an impact score for the respective event group and determining that the impact score satisfies a filtering threshold. Here, impact score indicates an amount of influence that the events of the respective group have on the target metric. The filtering threshold indicates an acceptable amount of influence on the target metric for a group event.

In some implementations, for each respective event group, the operations include generating an impact score for the respective event group, determining that the impact score fails to satisfy a filtering threshold, and removing the respective event group from the set of event groups after determining the influence pattern for the respective event group, but prior to clustering the set of event groups into event clusters. Here, impact score indicates an amount of influence that the events of the respective group have on the target metric. The filtering threshold indicates an acceptable amount of influence on the target metric for a group event.

In some configurations, for each respective event group, the operations include generating an impact score for the respective event group, determining that the impact score fails to satisfy a filtering threshold, and removing the respective event group from the set of event groups after determining the influence pattern for the respective event group, but prior to determining the influence pattern for the respective event group. Here, impact score indicates an amount of influence that the events of the respective group have on the target metric. The filtering threshold indicates an acceptable amount of influence on the target metric for a group event.

Optionally, either of the computerized method or the system may include the following features in any respective combination. Each respective training sample may represent the respective influence pattern of the respective event cluster and correspond to an event from the respective event cluster. Clustering the set of event groups into the event clusters based on the respective influence pattern may include determining whether the respective influence pattern of the respective event group satisfies a minimum similarity threshold with another influence pattern of another event group in the set of event groups and, in response to the respective influence pattern of the respective event group satisfying the minimum similarity threshold with the other influence pattern of the other event group, clustering the respective event group with the other event group in a respective event cluster. The event attribute characterizing the respective event may be a textual description of the respective event. The anomaly detection system may be a machine-learning-based anomaly detection system. Determining the influence pattern that identifies the influence of the respective event group on the target metric may include determining a mean expected influence for all events of the respective event group. Determining the influence pattern that identifies the influence of the respective event group on the target metric may include performing a weighted L2 minimization across a time series representing all events of the respective event group.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Introduction

Figure 1:
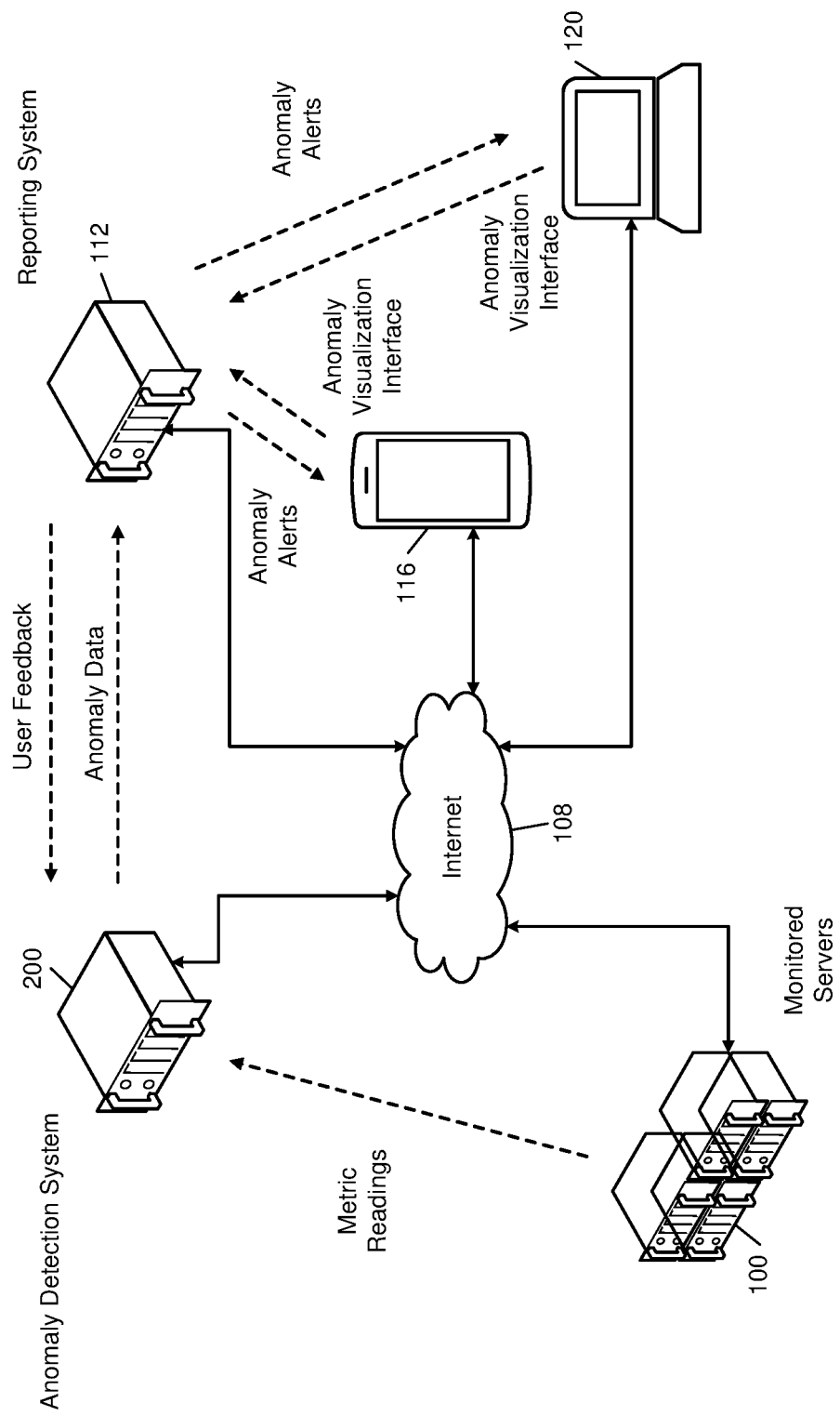
FIG. 1 is a schematic view of an example data monitoring environment.

The age of technology and the data it produces has given computing systems a vast amount of potential feedback. Data that is output by a system can be informative as to the performance of a computing system or the performance of a behavior related to the data. Because of the volume of data generated today, many businesses are aware that interpreting data can provide value and unlock a wide array of insights. For these reasons, among others, monitoring systems have evolved to detect and to alert on anomalous behavior that impacts businesses, networks, and other data-based domains.

Often, to perform anomaly detection, monitoring systems seek to accurately forecast future values of a time-series metric. For example, by accurately forecasting future values, a business or individual can plan for certain future situations. To illustrate, a business may be able to manage inventory efficiently based on accurately forecasted future demand, allowing the business to operate lean and carry less sunk inventory costs (e.g., implementing just-in-time inventory practices).

To accurately forecast the future values for a particular metric (e.g., revenue, number of goods sold, computing resource performance, etc.), systems use the past values of a metric to learn patterns of behavior. Unfortunately, in many cases, the past values alone prove to be inadequate to produce accurate forecasts. That is, the past values or historical data by itself typically lack context about whether anything influenced a past value for that particular point of data. Stated differently, without additional knowledge or contextual information about what influences a metric's behavior to generate a particular past value, the past value can be misleading or even detrimental to understanding the actual pattern of behavior for a metric.

One reason that a past value, without any context, can be problematic for understanding the actual pattern of behavior for a metric is that special events, which occur at specific times, often influence the metric. This influence can explain past values as well how to forecast future values for a metric. Generally speaking, events are special occurrences in time, which may be important for learning the behavior of a metric. Events can happen at irregular intervals, regular calendar intervals, or ad-hoc. Some examples of events are holidays (e.g., holidays by country, Lunar calendar events, Lunisolar calendar events), sales and marketing events (e.g., Black Friday, Autumn Sale, Back to School sale, first day of the quarter sale), weather events, (e.g., blizzard days, heavy rains, hurricanes, tornados, extreme wind), sporting events, financial events (e.g., interest rate publication, payment/ paycheck day, bank closure days, end-of-month accounting days), and technical events (e.g., deployment of a new software version, hardware upgrades).

For monitoring systems that deploy machine learning to understand patterns of behavior for a metric, events can offer useful information. An event can explain or provide context as to why an incident occurred for purposes of root cause analysis. For instance, an increase in the number of application crashes occurring right after the event of a new version release suggests that a bug in the new version caused the crashes. An event can also improve the accuracy of a machine-learning-based monitoring system. By taking into account the expected influence of an event on one or more metrics being monitored, the monitoring system can avoid false positives and/or reduce false negatives to improve forecasting accuracy. For example, an event that occurs irregularly or on an ad-hoc basis may appear as an anomaly in a metric rather than as an event that is anticipated to affect the metric. As an example of a false positive, a system may perceive the spike in revenue or decrease in inventory on Black Friday as an anomaly (which may trigger an alert and/or remedial action) if the system was not aware of the Black Friday event.

An influencing event is a type of event that has a predictable and measurable impact on the behavior of a metric when it occurs. In other words, the impact of an influencing event is quantifiable and can be reliably predicted (e.g., within some tolerance) for each instance of the influencing event. Therefore, instead of falsely identifying the impact of an influencing event as an anomaly, a monitoring system that accounts for the influencing event can detect an actual anomaly occurring during an influencing event, if such an anomaly occurs.

To illustrate, Cyber Monday is an influencing event on metrics related to revenue for many e-commerce companies in the United States. Generally, the impact of Cyber Monday is a dramatic increase in revenue during the event. If a machine learning monitoring system does not account for the influence of such an event on the revenue-related metrics of the e-commerce company, the spike in revenues would appear to be an anomaly, and a false alert might occur. On the other hand, when the influence of Cyber Monday is accounted for, this influence can help identify real anomalies. For instance, if the current year's revenues on Cyber Monday are lower than the expectation learned by the monitoring system, an alert indicating a drop in expected revenues can be communicated in real-time or near real-time such that remedial action(s) can be taken by an e-commerce company (e.g., to attempt to bring the revenue back to the expected levels of revenue).

An influencing event may be capable of impacting a metric before, during, and/or after the event occurs. By understanding how the baseline of a metric behaves before, during, and after the event occurs, the influence of an influencing event may be derived. As an example, Christmas is an annual event capable of multiple effects on different metrics at times around (before or after) or during the actual holiday itself. For an organization measuring revenue from sales, the days before Christmas are days that have a spike in revenue from sales. Yet for transportation companies, such as ride shares or taxi services, Christmas day is a drop day—a day that experiences more people staying home and relying less on transportation companies. Therefore, if the metric was the number of rides that occurred or the revenue from selling rides, Christmas has a predictable impact that negatively affects this metric on the holiday itself.

Unfortunately, understanding the impact of influencing events is not without its challenges. This is especially true for a machine-learning system where the impact has to be susceptible to being accurately and automatically learned. One of the challenges is automatically identifying if a group of historical events (e.g., the previous four Black Fridays) have any influence on a given time series— in other words, how significant the event has been historically on a given time series. Another challenge is determining the pattern of influence for an event accurately and robustly when a group has influence on a given time series. Furthermore, this pattern of influence should include the influence of the event both before and after the event. With a set of many events, there is also the challenge of automatically grouping the events into groups that share similar influence patterns. Grouping them may allow for an understanding of what the event is in order to enable future prediction (i.e., perform a prediction task).

Often to create robust prediction capabilities for a machine learning system, there generally needs to be a corpus of training examples of a particular size or greater. However, the events that can teach a machine learning system to make future predictions about the behavior of a metric may be sparse. For example, there will be at most ten samples of Black Friday events for the entire previous decade of data. Due to this sparse sample set, a system that determines the pattern of influence for events faces the challenge of generating an adequate number of training examples for the machine learning system.

To address some of these challenges, the event influencer described here is configured to group events by event attributes, determine the influence pattern of a particular group of events, and to cluster or associate together groups that share a similar influence pattern. As discussed in further detail below, with this approach, the event influencer is able to generate training samples that enable a machine learning monitoring system (e.g., an anomaly detection system) to learn to predict the influence of an event to ensure accurate data monitoring. Moreover, by clustering, the approach enables a refined and accurate estimation of the event influence, especially as more examples of the same event are present. Although the event influencer is generally described in conjunction with an anomaly detection system, the event influencer may be deployed in any situation to inform a system of the impact or influence of a particular event. In this sense, the event influencer is ripe for many different types of applications that perform forecasting and may be impacted by event behavior.

System Overview

In FIG. 1, a set of monitored servers 100 is shown as an example of infrastructure to be monitored. The monitored servers 100 may include production servers as well as monitoring servers that measure metrics of the production servers. Some metrics may be generated and reported automatically while others are measured externally.

Although depicted as computing servers, monitored hardware can include not just computers but other hardware and software capable of instrumentation. For example, industrial control systems, factory automation, etc., may all generate and/or be observed to generate a number of metrics that can be evaluated by an anomaly detection system 200. Further, even within computing hardware, the monitored servers 100 could alternatively or additionally include desktop computers, smartphones, tablets, dedicated hardware (such as storage area networks, voice-over IP systems), etc.

As used in this application, metrics can encompass more than just information technology, such as hardware and/or software performance. Metrics according to the principles of the present disclosure can include, as examples only, business metrics (revenues, active users, etc.), production metrics (inventory, manufacturing line output, etc.), and application performance metrics (transactions per second, sales conversion rates, etc.).

The monitored servers 100 may be physical servers, virtual servers, hosted servers, etc. In one example, the monitored servers 100 may be instances in an Amazon Web Services (AWS) Elastic Cloud Compute (EC2) environment. As shown in FIG. 1 with a dashed line, metric readings are effectively transmitted from the monitored servers 100 to the anomaly detection system 200.

Physically, the metric readings may be transported over the internet (represented at 108) or over any other communication system. The metric readings will generally be encrypted when sent over the internet 108, such as by using a Virtual Private Network (VPN) or some other secure transport facility such as Secure File Transfer Protocol (SFTP) or transport layer security (TLS).

The anomaly detection system 200 analyzes the metric readings and, as described in more detail below, characterizes normal and abnormal behavior and determines the significance of detected anomalies. This anomaly data is transmitted to a reporting system 112, which can generate anomaly alerts to system administrators. For example, these anomaly alerts may be sent via text message to a mobile phone 116 or by email or through a monitoring dashboard interface to a laptop 120. Anomaly alert may also be logged, such as with a SIEM.

The anomaly detection system 200 and the reporting system 112 may be integrated together and simply referred to as the anomaly detection system 200. They are shown separately in FIG. 1 simply for ease of illustrating their respective functionality. The anomaly detection system 200 and the reporting system 112 may be hosted on dedicated hardware or in cloud computing instances. The data they store may also be stored in dedicated hardware or in cloud storage, such as AWS Simple Storage Service (S3) and AWS Elastic Block Store (EBS).

The anomaly detection system 200 and the reporting system 112 may be owned and operated by the provider of the anomaly detection system 200 through a service agreement. Alternatively, the anomaly detection system 200 and the reporting system 112 may be purchased as hardware or as virtual machines and then operated by the owner of the monitored servers 100.

The mobile phone 116 interacts with an anomaly visualization interface presented by the reporting system 112. This interface may allow active anomalies to be seen in real time and may allow prior anomalies to be evaluated. A user of the mobile phone 116 may provide feedback on various reported anomalies to the reporting system 112. For example, this feedback may identify an anomaly as representing a false positive or a true positive. A false positive means that the anomaly does not actually represent anomalous behavior or at least does not indicate an actual or impending issue. Meanwhile, a true positive would mean that the detected anomaly corresponded to some actual issue with the monitored servers 100.

The laptop 120 may also access the anomaly visualization interface. The interface may be tailored to different screen sizes such as by limiting the information provided to the mobile phone 116 to more significant information than might be shown to the laptop 120. The mobile phone 116 and the laptop 120 may be owned by system administrators employed by the owner of the monitored servers 100 or may be owned by the provider of the anomaly detection system 200 or a third party. Such a third party could monitor for anomalies and report to the owner of the monitored servers 100 when a problem appears to be occurring or expected.

The detected anomalies may signify, and be used to examine, a wide variety of issues. These issues include uptime and reliability, security, responsiveness to users, efficient resource usage, business trends, etc.

Anomaly Detection System

Figure 2:
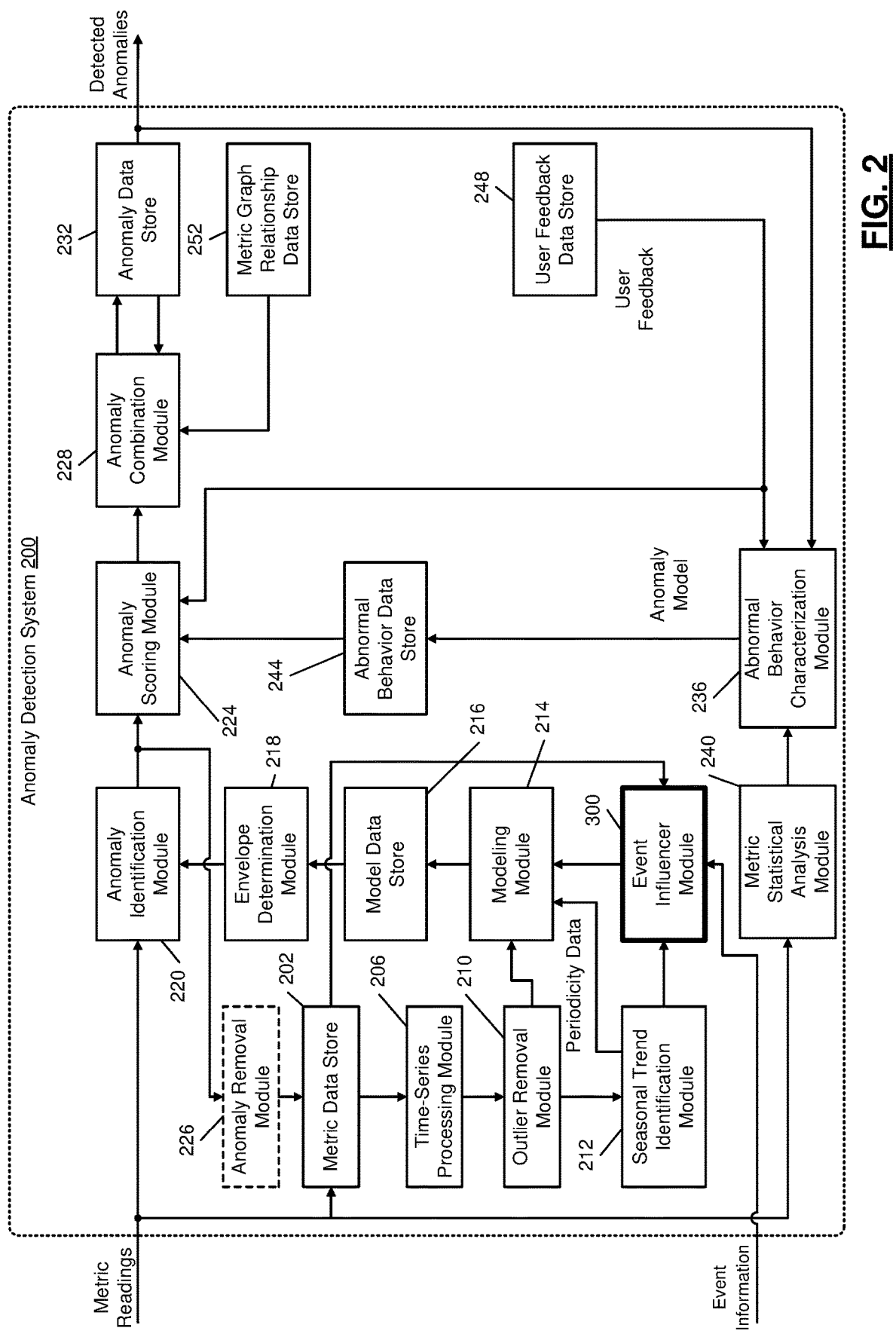
FIG. 2 is a schematic view of an example anomaly detection system, which may be deployed in the data monitoring environment of FIG. 1.

In FIG. 2, an example implementation of the anomaly detection system 200 is shown. Metric readings are received by the anomaly detection system 200 and stored in a metric data store 202. FIG. 5C is a plot of example time-series data that may be received by the anomaly detection system 200. A time-series module 206 receives stored metric data and generates time-series data based on the metric values. The time-series module 206 identifies contiguous time intervals of the received metric data that are not missing large gaps of metric readings. Each of these sets of contiguous data may be evaluated separately. The time-series module 206 may supply missing data points for small gaps in the data, such as by interpolating. Interpolation may be linear or more elaborate, such as higher-order polynomial interpolation. The time-series module 206 may also de-trend the data. The time-series module 206 provides the time-series data to an outlier removal module 210.

The outlier removal module 210 filters out extreme irregularities from the received time-series data. For example, the outlier removal module 210 may remove data points associated with a malfunctioning sensor. The outlier removal module 210 may remove data points that are greater or less than an immediately preceding data point by a predetermined value. As an example, the outlier removal module 210 may filter out a data point that is at least five times greater than or five time smaller than a preceding value. In other implementations, the predetermined value may be another suitable value that coarsely filters the time-series data to remove extreme irregularities. Interpolation may be used to replace the removed irregularities. The outlier removal module 210 provides the filtered time-series data to a seasonal trend identification module 212 and a modeling module 214.

The seasonal trend identification module 212 analyzes readings of a metric over a period of time, such as days, weeks, or months, and identifies whether there are seasonal trends in the metric. Seasonal trends may, for example, identify that each seven-day period contains five consecutive days where activity for the metric is higher than the remaining two days. Of course, this likely corresponds to the standard five-day work week.

The seasonal trend identification module 212 may also determine that twenty-four-hour cycles are present, where the expected value of the metric may differ depending on the time of day. In various implementations, identification of these seasonal trends may be completely algorithmic, with no preset information provided to the seasonal trend identification module 212 about the existence of seven-day weeks, twenty-four-hour days, etc. In other implementations, some knowledge may be designed in, such as ranges corresponding to anthropocentric schedules, such as the 24-hour day, the 7-day week, and the 365.25-day year.

The modeling module 214 generates a model of the time-series data. In response to the seasonal trend identification module 212 identifying a seasonal trend in the time-series data, the modeling module 214 generates a seasonal model—for example, a seasonal autoregressive integrated moving average (ARIMA) model—of the time-series data. Specifically, the modeling module 214 generates a model of the seasonal dynamic of the time-series data and a model of the non-seasonal dynamic of the time-series data. The modeling module 214 then merges the two models to generate the seasonal model of the time-series data. In response to the seasonal trend identification module 212 not identifying a seasonal trend in the time-series data, the modeling module 214 generates a standard model of the time-series data.

The modeling module 214 is also configured to generate the model of the time-series data by training on training samples from an event influencer module 300. The event influencer module 300 receives event information and metric data (e.g., metric readings from the metric data store 202) and generates training samples that teach the event influencer module 300 to recognize influence patterns for events that occur in the metric data. In other words, the training samples allow the model to indicate when an event takes place and allows the anomaly detection system 200 to account for these events.

A model data store 216 stores models of the time-series data generated by the modeling module 214. Based on the stored models of the time-series data, an envelope determination module 218 determines a normal operating envelope for the metric. The normal operating envelope may be a function of time, and may define a range of expected values for each point in time. The range of expected value may be based on a Gaussian distribution.

An anomaly identification module 220 can then use the normal operating envelope from the envelope determination module 218 to determine what the readings of a metric should be and identify deviations from the normal operating envelope. When an anomaly in a metric is identified, this detection is provided to an anomaly scoring module 224.

In some implementations, the anomaly detection system 200 may include an anomaly removal module 226. The anomaly removal module 226 removes metric readings associated with an anomaly identified by the anomaly identification module 220 from the metric data store 202. In this way, the anomaly detection system 200 only uses metric readings associated with normal operation to generate the model of the metric reading and, subsequently, the normal operating envelope.

The anomaly scoring module 224 determines a score for the detected anomaly based on how significant the anomaly appears to be. As the intensity of the anomaly increases (that is, the amount of deviation of the metric away from the baseline), and as the duration of the anomaly increases, the score correspondingly increases. An anomaly combination module 228 combines the score for the single metric calculated by the anomaly scoring module 224 along with the scores of other detected anomalies. These scores, and in some cases other characteristics of the other anomalies, are stored in an anomaly data store 232.

The anomaly data store 232 provides details of anomalies for other metrics to the anomaly combination module 228 and also stores scores and data related to combined anomalies as determined by the anomaly combination module 228. The anomaly data store 232 also provides information about the detected anomalies to, for example, the reporting system 112 associated with the anomaly detection system 200.

The detected anomalies are analyzed by an abnormal behavior characterization module 236 to determine a model of anomalies experienced by each metric. A metric statistical analysis module 240 may determine statistics for each metric, such as absolute minimum value, absolute maximum value, mean, median, standard deviation, etc. The absolute minimum and maximum values determine a range within which the metric operates. For example, the values of a CPU utilization metric will generally fall within a range between 0% and 100%.

The metric statistical analysis module 240 allows the anomaly detection system 200 to determine these ranges without explicit input from operators of the monitored servers 100. Using statistical analysis, the metric statistical analysis module 240 can determine that, for example, a metric of CPU utilization varies between 12% and 100% while a query response time varies between 40 and 3000 (which may represent time in milliseconds).

The abnormal behavior characterization module 236 analyzes anomalies for a metric from the anomaly data store 232 and statistical values for the metric from the metric statistical analysis module 240 and generates an anomaly model for storage in an abnormal behavior data store 244.

The anomaly model may also be based on user feedback from a user feedback data store 248. For example, anomalies identified by the user as being less significant or not representative of actual problems may be weighted less heavily in determining the anomaly model. The anomaly scoring module 224 uses the anomaly model for the metric from the abnormal behavior data store 244 to determine how significant a given anomaly is. For example, if the intensity of the detected anomaly is greater than the typical anomaly for the metric, this is an indication of greater significance. Further, if the duration of the anomaly has already exceeded an expected value of anomaly duration, this is yet another indication of significance of the anomaly.

When combining multiple anomalies into a single combined anomaly, relationships between the metrics are specified by a metric graph relationship data store 252. When multiple anomalies are present across related metrics, this may be an indication of greater significance of the combined anomaly.

Event Impact Learning

Referring to FIGS. 3-7, the functionality of the event influencer module 300 enables the anomaly detection system 200 to predict the future influence of an event when an instance 302 of the event occurs again. That is, the event influencer module 300 operates as a training process that learns the impact of events on a time-series metric 304. The event influencer module 300 learns the impact of events on the time-series metric 304 from historical instances 302 of those events. For clarity, each time an event occurs, the specific occurrence of the event is referred to as an event instance 302 or instance 302 of the event. This means that the event may be a Cyber Monday Sale and the instances 302 of that event over the past three years would be the Cyber Monday Sales from 2021, 2020, and 2019.

Generally speaking, the event influencer module 300 receives, as input, the time-series metric 304 with historical measurements of that metric 304 over a period of time t and a list of event instances 302 that also occurred over the same period of time t. For instance, the metric 304 corresponds to daily revenues of a company over a time period t of three years and the event instances 302 include all of the holidays in the United States for that three-year period as well as all the sales events that the company had over the three-year period.

Figure 3:
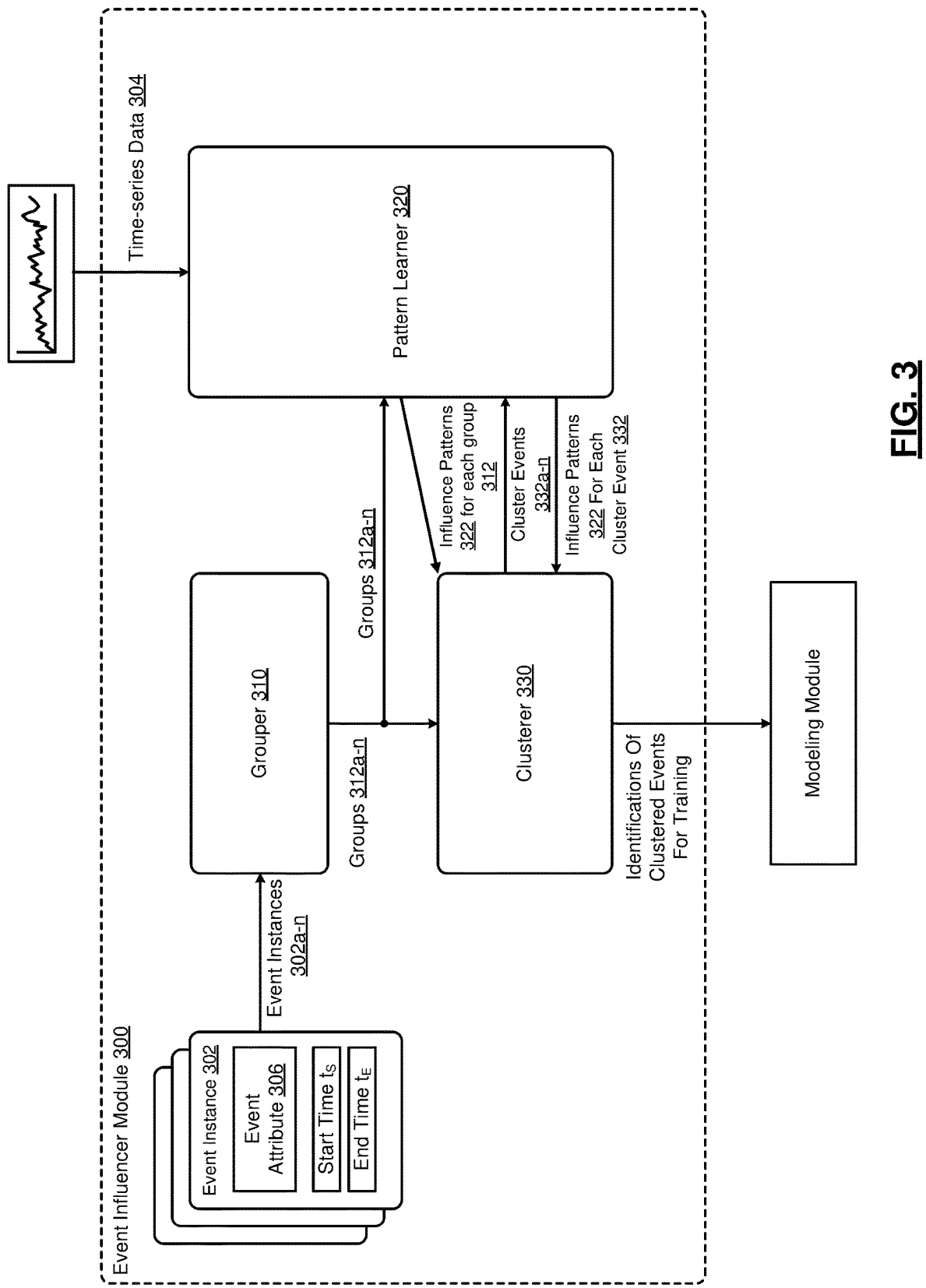
FIG. 3 is a schematic view of an example event influencer module, which may be deployed the anomaly detection system of FIG. 2.
Figure 4:
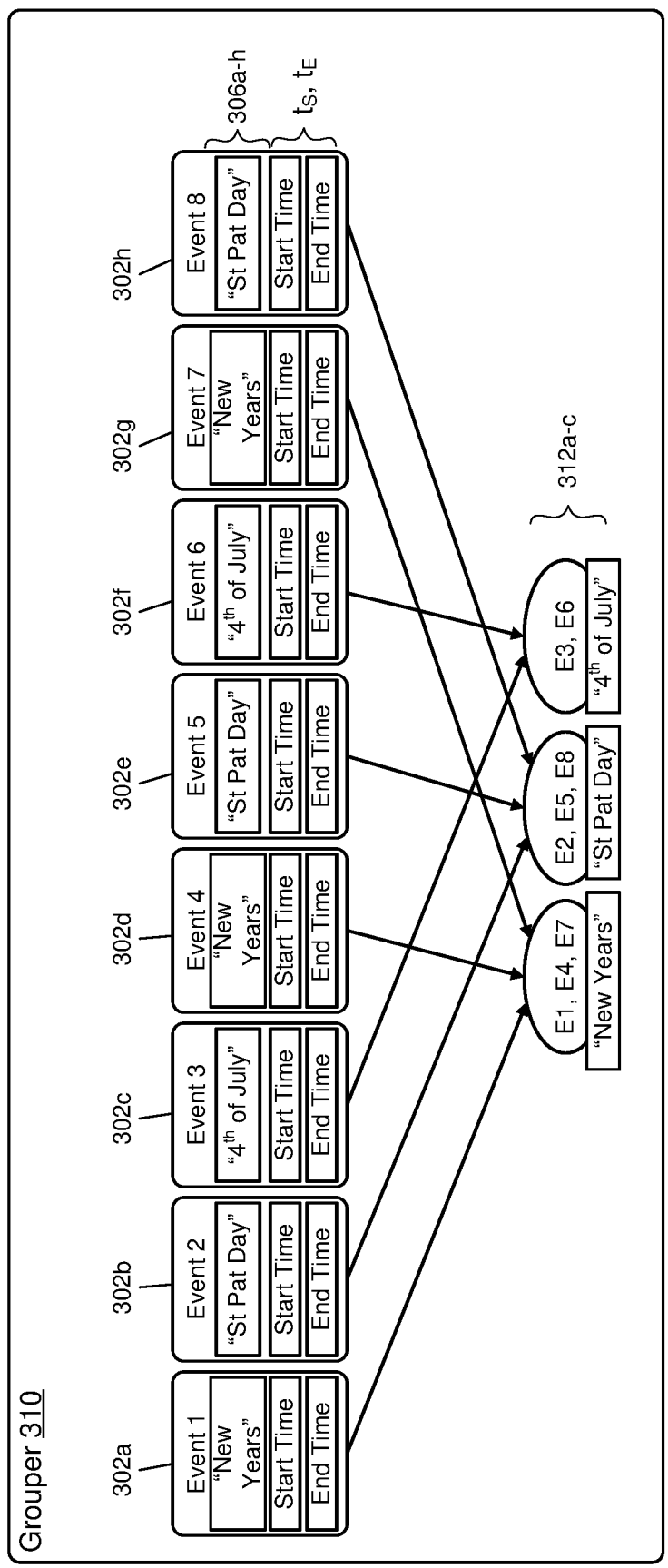
FIG. 4 is a schematic view of an example grouper for the event influencer module of FIG. 3.

As shown in FIGS. 3 and 4, in some implementations, an event instance 302 includes one or more event attributes 306 and a timing for the event instance 302. For example, each event instance 302 includes a start time $t_S$ and an end time $t_E$ to designate a timing for the event instance 302. In some examples, the event attribute 306 is a field with a textual description of the event. To illustrate, FIG. 4 depicts eight event instances 302a-h with each event having event attributes 306 that textually describe the event as a particular holiday. In this example, there are three New Years event instances 302a,d,g, three St. Patrick's Day events instances 302b,e,h, and two Fourth of July event instances 302c,f.

In some configurations, such as FIGS. 3-7, the event influencer module 300 includes a grouper 310, a pattern learner 320, and a clusterer 330. The grouper 310 is configured to receive a set or list of event instances 302 for a given time-series metric 304 and to group the event instances 302 of the set into event groups 312a-n. The pattern learner 320 is configured to generate influence patterns 322 based on a plurality of event instances 302 (e.g., based on an event group 312 including the plurality of event instances 302 or an event cluster 332 including the plurality of event instances 302). The clusterer 330 is configured to receive the set of event groups 312 along with their corresponding influence patterns 322 and to generate one or more event clusters 332 that share a similar influence pattern 322.

In some examples, such as FIG. 4, the grouper 310 determines which event instances 302 share the same event attribute 306 and generates an event group 312 for each unique event attribute 306. In this sense, each event group 314 corresponds to an event attribute 306 and includes one or more event instances 302 having that same event attribute 306. For instance, the grouper 310 associates event instances 302 together in a group 312 based on matching event attributes 306.

To illustrate, FIG. 4 shows the grouper 310 generating three event groups 312a-c based on eight event instances 302a-h. The first event group 312a includes three New Years events 302a,d,g due to their matching "New Years" event attributes 306. The second event group 312b includes three St. Patrick's Day events 302b,e,h due to their matching "St Patrick's Day" event attributes 306. The third event groups 312c includes two Fourth of July events 302d,f due to their matching "4th of July" event attributes 306. Although FIG. 4 illustrates the grouper 310 using an exact string match to group together the event instances 302, the grouper 310 may use other grouping techniques, such as 90% string match, fuzzy match, semantic match, glossary match, etc.

As shown by FIG. 4, the grouper 310 functions to automatically identify event instances 302 of the same event and to group these instances 302 together without requiring manual administrative efforts. By grouping all instances 302 of an event together, the event influencer module 300 is able to gain a historical understanding of the event from the context of multiple data points for the event (i.e., multiple event instances 302). For this reason, the grouper 310 is configured to initially group all of those event instances 302 together. If the grouper 310 failed to group instances 302 of the same event together, it could be difficult for the anomaly detection system 200 to forecast or predict the impact of a future event instance 302 of an event.

For example, if the grouper 310 produced two different groups 312 for the same event, the anomaly detection system 200 may not know whether to predict a future event instance 302 of that event according to a first influence pattern 322 for a first event group 312 corresponding to the event or a second influence pattern 322 for a second event group 312 corresponding to the event. To illustrate, in the following example, the holiday of New Year's Day accidentally has two different spellings, (1) "New Year" (without an "s") and (2) "New Years," (with an "s") according to its event attributes 306. In this example, the event attributes 306 for all the event instances 302 include a first event attribute 306 of "New Year" and a second event attribute 306 of "New Years" spelled differently (or misspelled) than the first event attribute 306, a simplistic implementation of the grouper 310 may form a first event group 312 for event instances 302 with the first event attribute 306 having a spelling of "New Year" and a second event group 312 for event instances 302 with the second event attribute 306 having the spelling of "New Years." Yet, in reality, all of these event instances 302 correspond to the holiday of New Year's Day, but have event attributes 306 with alternative spellings.

In this example, the pattern learner 320 generates an influence pattern 322 for each event group 312 (e.g., using exact string match). That is, a first influence pattern 322 for the first event group 312 corresponding to "New Year" and a second influence pattern 322 for the second event group 312 corresponding to "New Years." Here, because event instances 302 of the same event (i.e., New Year's Day) were not all grouped together and instead formed two separate event groups 312 having their own influence patterns 322, the result may be that the anomaly detection system 200 during inference may apply either influence pattern 322 (i.e., the first influence pattern 322 for the "New Year" event group 312 or the second influence pattern 322 for the "New Years" event group 312) to predict the influence of a future instance 302 of the event or cause the anomaly detection system 200 to err in its prediction.

Furthermore, by separating instances 302 of an event, the influence pattern 322 generated for a subset of instances 302 of the event may lack key insights about the potential behavior of the event when compared to the insights of all instances 302 of the event. In other words, the "New Years" instances may correspond to a lower revenue generation pattern than the "New Year" instances. A prediction of the impact of a future instance of the New Year's holiday may therefore result in an inaccurate overestimation of revenue generation (if using the influence pattern 322 from the "New Year" instances) or an inaccurate underestimation of revenue generation (if using the influence pattern 322 from the "New Years" instances).

The pattern learner 320 is configured to receive the event groups 312 (e.g., from the grouper 310) and the time-series metric 304 input into the event influencer module 300 and to determine an influence pattern 322 for each event group 312. The influence pattern 322 identifies an influence of an event group 312 on the metric 304. In some examples, the pattern learner 320 determines a pattern because an event instance 302 is capable of having an impact on the metric 304 over some length of time (i.e., window of time). For example, the influence impacts the metric 304 for some time before the event, during the event, and/or some time after the event. For this reason, the influence of an event is a pattern of influence that extends some window in time around the event instance 302 of the event. Although generally shown in the figures that the pattern learner 320 determines the influence of an event as an influence pattern 322, the pattern learner 320 is also capable of determining the impact of an event as a single influence value.

Figure 5A:
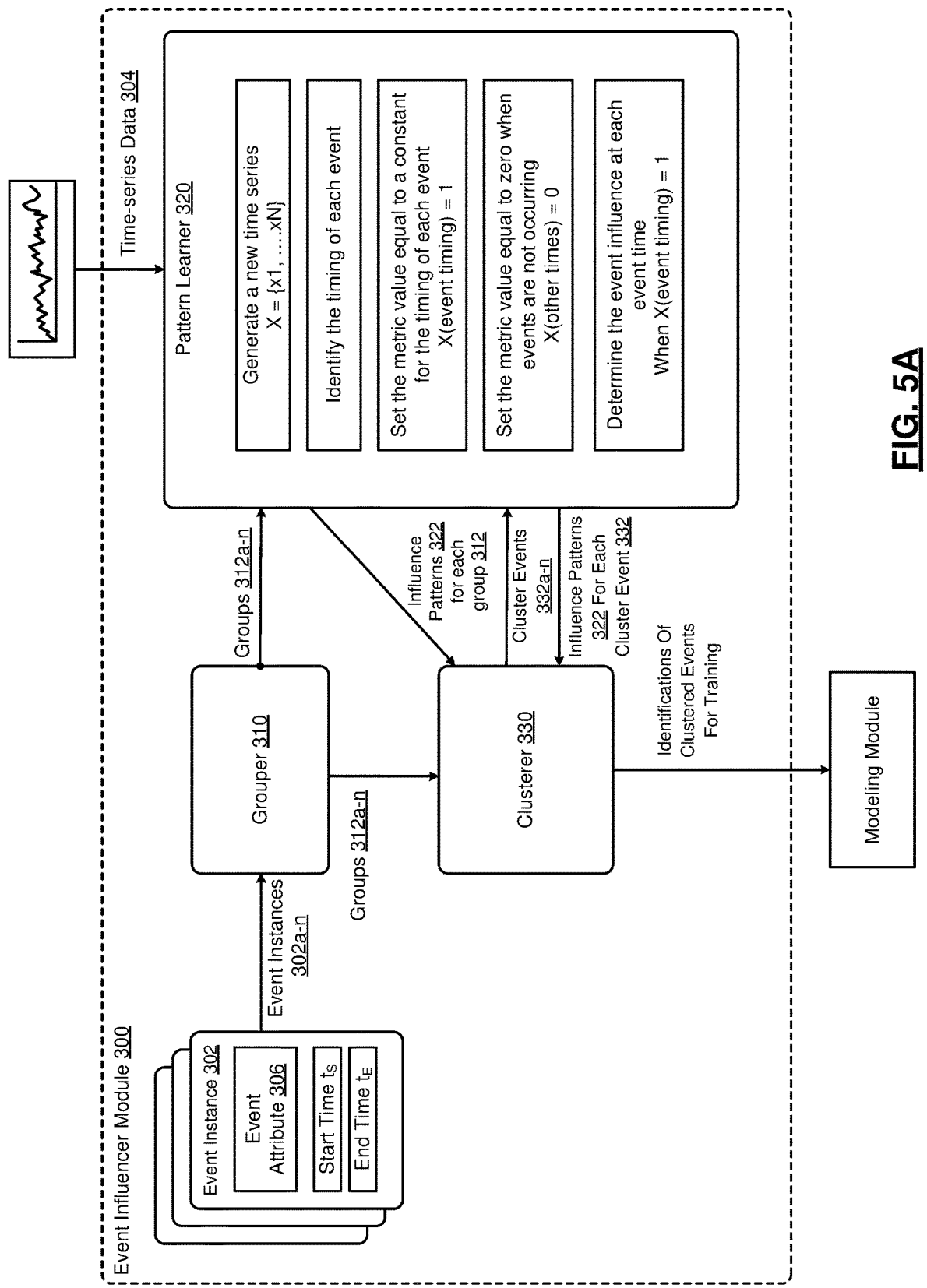
FIG. 5A is a schematic view of an example pattern learner for the event influencer module of FIG. 3.
Figure 5B:
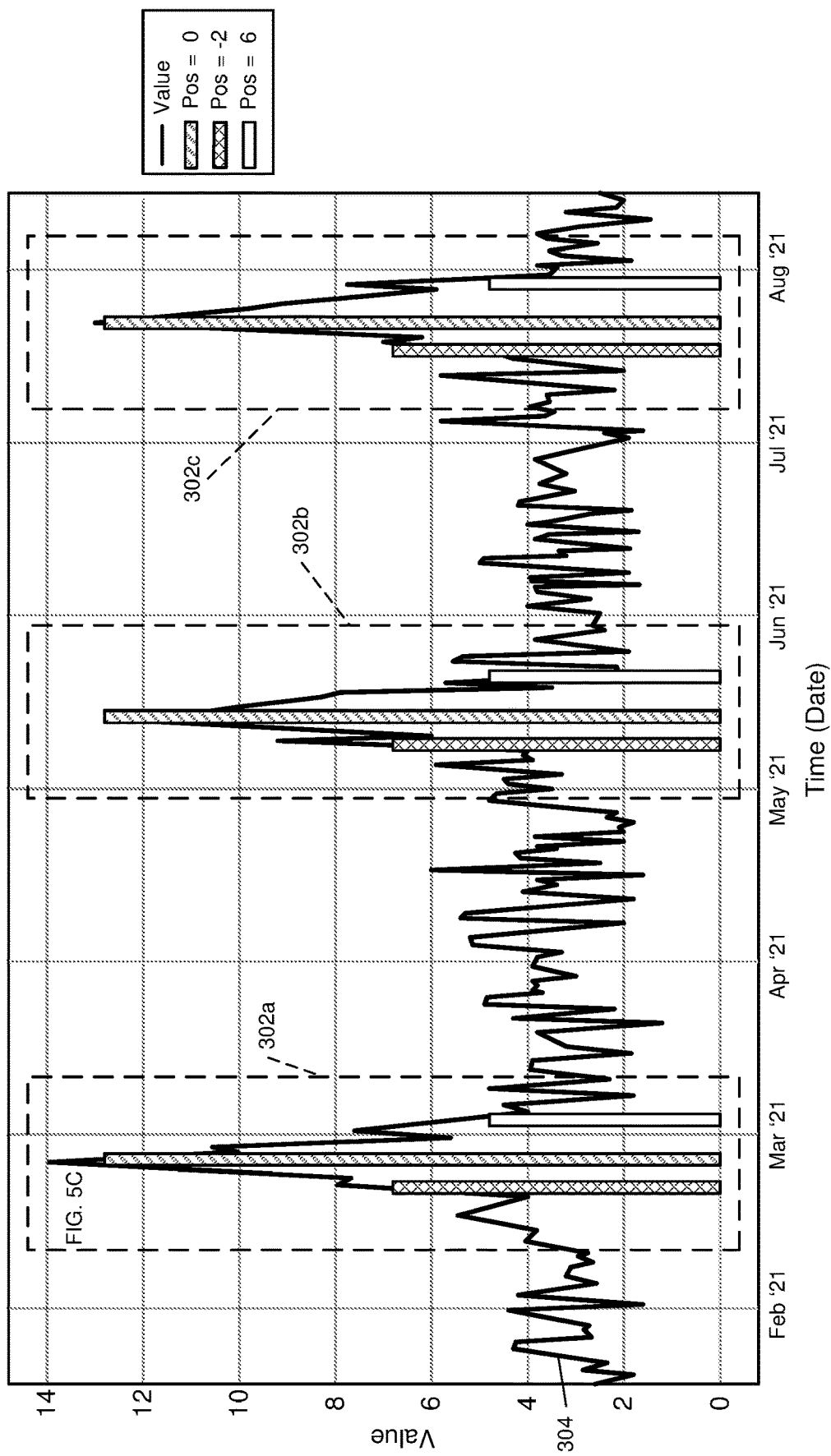
FIG. 5B-5D are graphical illustrations of example pattern learning operation consistent with FIG. 5A.
Figure 5C:
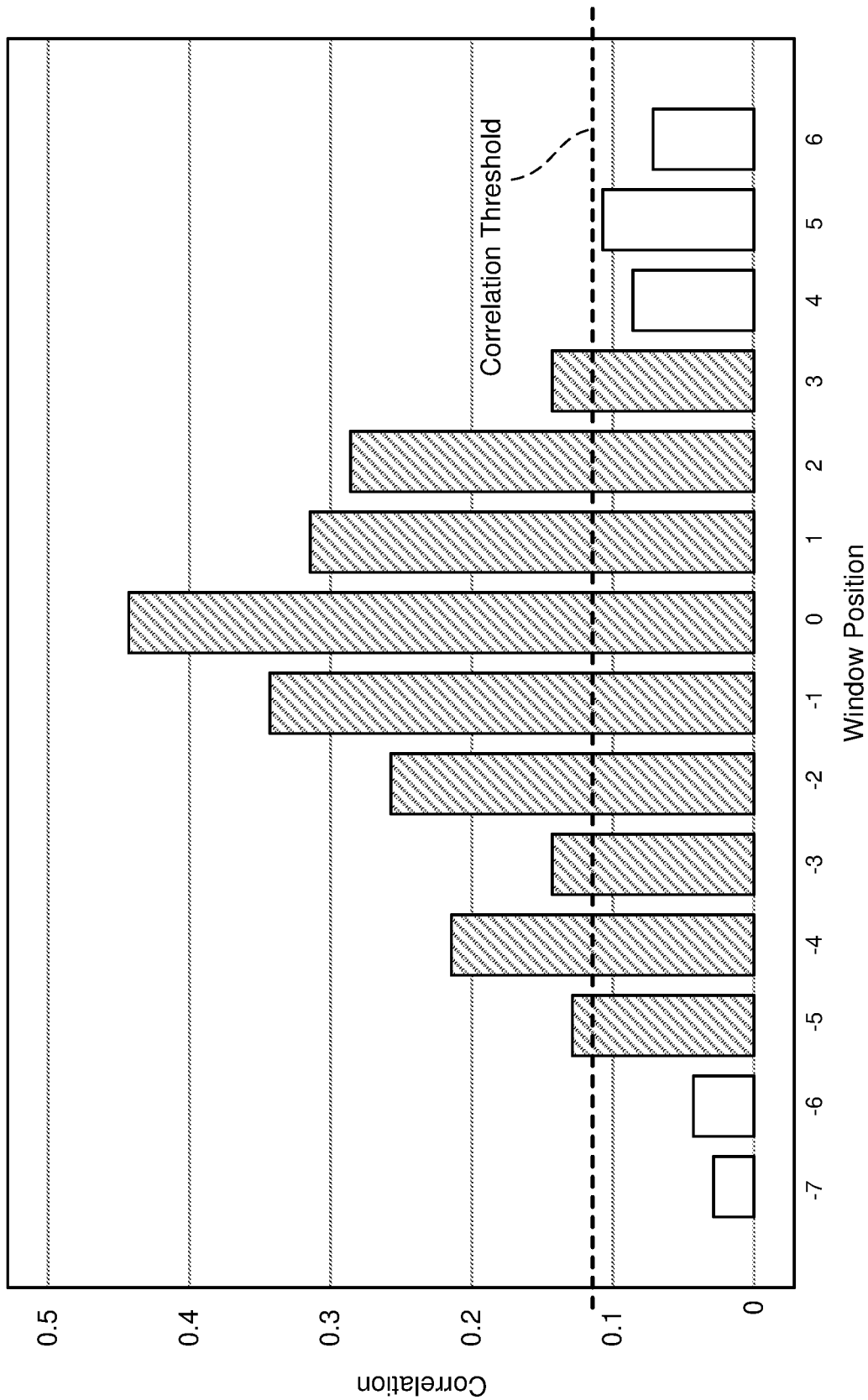
Figure 5D:
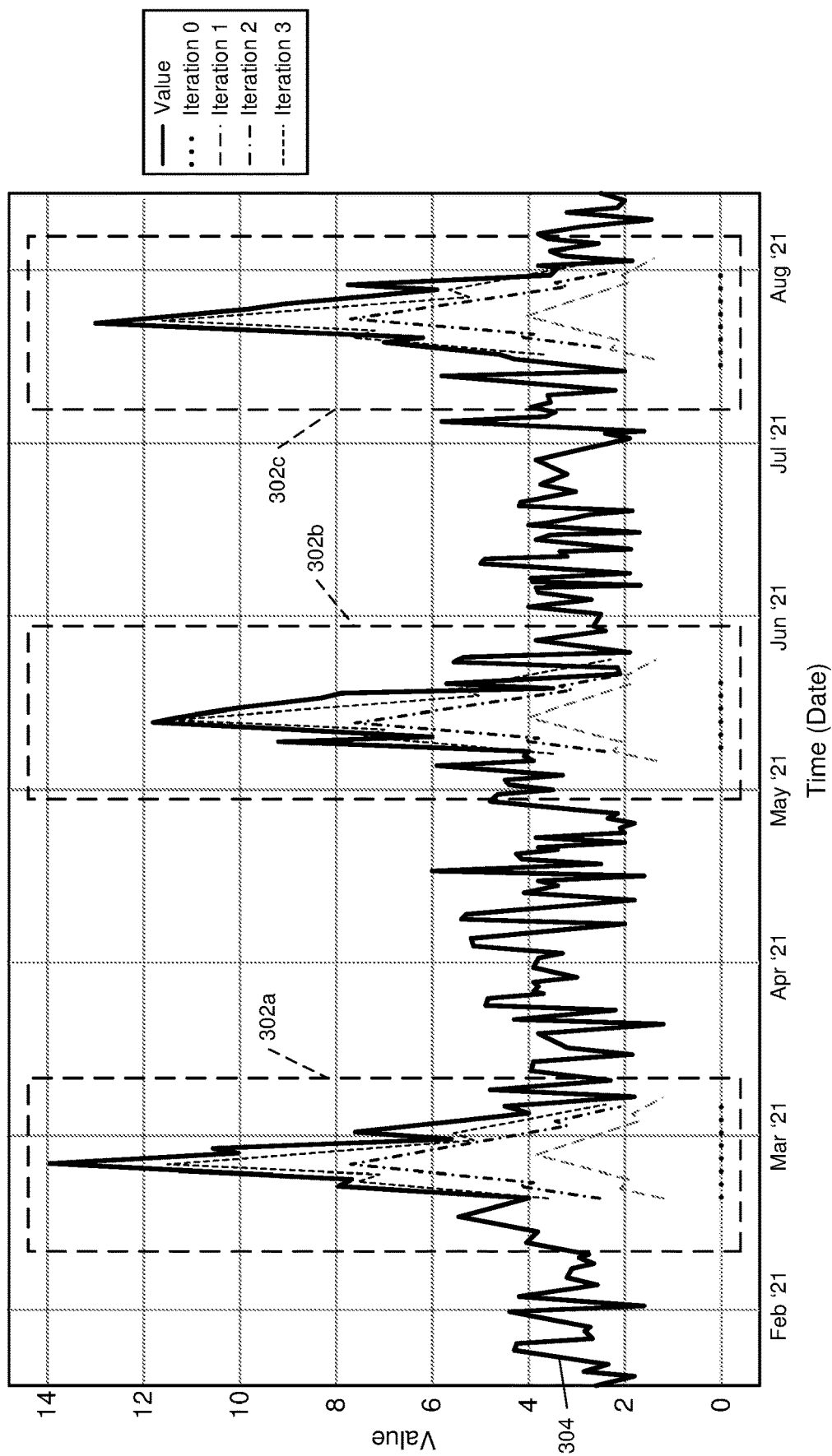

Referring to FIGS. 5A-5D, in some implementations, the pattern learner 320 performs a pattern learning algorithm to generate the influence pattern 322 for an event group 312. The pattern learner 320 then repeats the pattern learning algorithm for each event group 312 that the pattern learner 320 receives from the grouper 310. In these implementations, for an event group 312, the pattern learner 320 generates a new time series that spans the timing of all event instances 302 in the event group 312. For instance, FIGS. 5B and 5D show an eight month time span for a given metric even though the time series is actually greater than eight months. That is, although the time-series metric 304 may include some greater time of metric behavior (e.g., three years of behavior), the pattern learner 320 focuses on the timing of the event instances 302 in the event group 312 (e.g., the eight months) instead of the entire period of metric behavior (e.g., the three years). For example, FIG. 5A illustrates the metric value of X with a set of indexed metric values at discrete intervals of time, X (t=1) to X (t=N).

The pattern learner 320 then identifies the timing of each event instance 302 in the event group 312. For instance, the pattern learner 320 interprets the timing of each event instance 302 to correspond to a period of time spanning from the start time is to the end time $t_E$ for each event instance 302. With the identified timing of each event instance 302 of the event group 312, in some examples, the pattern learner 320 sets the metric value equal to a value that designates that an event instance 302 is occurring at that time. For example, the pattern learner 320 sets the metric value equal to a constant (e.g., a value of 1) during the timing of each event instance 302. For any other time during the new time series, the pattern learner 320 sets the metric value equal to zero (or some other designated value) to indicate that an event instance 302 is not occurring during that time. With the new time series setup to indicate event timing, the pattern learner 320 determines the event influence at each event time of the event group 312 to form the influence pattern 322 for that particular event group 312. For instance, the pattern learner 320 determines the event influence at the instances in the new time series where the metric value is equal to the constant designating that an event was occurring at that time (e.g., equal to a value of 1). To illustrate, FIGS. 5B and 5D depict a portion of the time series with three event instances 302a-c that form a new time series, which enables the pattern learner 320 to identify the influence pattern 322.

In some cases, the duration of event influence for an event instance 302 may be difficult to determine. Here, the pattern learner 320 may use a slightly different approach to generate the new time series that is based on a reference time for the event instance 302. This may avoid having to initially determine an influence window for the event instance 302 and set the entire window to the metric value. As an example of this approach, the start time is for each event instance 302 is set to a metric value equal to a constant (e.g., a value of 1) such that the pattern learner 320 is able to determine an event influence for a window (e.g., an indexable window) around that start time is (e.g., using the metric value as a reference point). With the reference point, the pattern learner 320 can construct a window and analyze each index of the window as the window is time-shifted (i.e., indexed) from the reference point. By time-shifting the window from a known timing of the event instance 302, the pattern learner 320 can span a length of time to determine the boundaries of the event influence for the event instance 302. An advantage of this type of influence learning is it can be based on a single reference point (e.g., the start time is or end time $t_f$) that the pattern learner 320 is able to obtain for an event instance 302. Here, the pattern learner 320 may obtain the timing information from the event attributes 306 corresponding to each event instance 302.

Referring to FIGS. 5B and 5C, the first event instance 302a has a start time is at the first window position designated as position 0. From this initial position 0, FIG. 5C illustrates that the window may then be time-shifted from the initial position 0 by indexing the window forward or backward in time some number of positions (or time steps). Here, FIG. 5C depicts seven positions backwards (e.g., designated as −1 to −7) and six positions forward (e.g., designated as 1 to 6). To help provide overall context, FIG. 5B depicts three of the window positions (shown as position 0, position −2, and position 6) in the context of the time series for the metric 304 as an example of the windowing process by the pattern learner 320.

In some implementations, such as FIGS. 5B and 5C, the pattern learner 320 uses a correlation-based approach to determine the event influence at each event time (i.e., over the event timing of an event) of the event group 312. With a correlation-based approach, the pattern learner 320 determines a mean expected influence for all event instances 302 corresponding to an event group 312. In some configurations, the correlation-based approach identifies that a time series for the metric 304 (e.g., the new time series) includes a first component without event effects (e.g., with a metric value of 0) and a second component with event effects (e.g., with a metric value of 1). Based on this identification, the correlation-based approach correlates a shifted event indicator time series (e.g., the new time series) with the time series for the metric 304 input into the event influencer module 300 across window lags (e.g., all window lags).

In some implementations, the window lag corresponds to a window of effect for a particular event. That is, a length or size of a window lag may be defined by a minimum lag and a maximum lag. Here, the minimum lag for the window corresponds to an earliest time prior to the event time when the event instance 302 effects the metric 304 and the maximum lag corresponds to a latest time after the event time when the event instance 302 effects the metric 304. In this respect, the window lag is relative to the event timing. As an example, if the effect of the event instance 302 starts ten time steps before the event timing (e.g., the start of the event) and stops ten time steps after the event timing (e.g., the end of the event), the minimum window lag is −10 and the maximum window lag is 10. Therefore, the window lag spans at least twenty time steps in addition to the actual event timing.

Generally speaking, in a correlation-based approach, the pattern learner 320 determines whether a particular index of the window (e.g., at a particular window position as shown in FIG. 5C) has a great enough impact on the metric 304 to contribute to an influence pattern 322 for an event. For instance, the pattern learner 320 determines a correlation between each index of the window (e.g., at each indexed window position) and determines whether the correlation at each index satisfies a correlation threshold. Referring to FIG. 5C, the correlation threshold is set to a value of 0.125. Here, when the correlation of a particular index of the window is greater than (or equal to) the value of 0.125, the particular index of the window satisfies the correlation threshold. FIG. 5C illustrates the window positions that satisfy the correlation threshold with a cross hatching pattern. By satisfying the correlation threshold, the window position's impact is high enough to be included in the influence pattern 322. Therefore, in this example, all of the cross hatched positions form the influence pattern 322 of a single event instance 302. The process may then be repeated for each event instance (e.g., repeated for the second and third event instances 302b,c of FIG. 5B) to understand the influence pattern 322 for a given event.

In the correlation-based approach, the approach may assume that there is no correlation between the event indicator time series and the first component. This assumption enables the approach to generate a matrix equation (e.g., a Toeplitz matrix equation or diagonal-constant matrix) representing the relationship between the mean effect influence and Pearson correlation coefficients between the input time series and the event indicator time series. The pattern learner 320 solves the resulting equation to derive the effect influence (e.g., the influence pattern 322) for an instance of an event corresponding to the event group 312.

In some examples, the correlation-based approach assumes that a time series for the metric 304 is stationary and can be decomposed as the sum of a time series without regressor effects (e.g., similar to the first component) and a time series with only regressor effects (e.g., similar to the second component). For example, equation (1) below is an example representation of this decomposition for time-series metric $Y_t$.

$$Y_t = Y_{no\text{-}reg,t} + Y_{reg\text{-}only,t} \quad (1)$$

Here, there the correlation-based approach assumes there is no correlation between the instances 302 of the event for a particular group 312 and $Y_{no\text{-}reg,t}$.

In these examples, the pattern learner 320 can have z represent an event indicator series (e.g., the new time series) having a value of 1 during event time steps or at a particular reference time step (i.e., when an event instance 302 occurred) and a value of 0 at other time steps. The event indicator series z can also include an effect pattern window (i.e., influence pattern 322 of a window lag) represented as $\alpha_{l_{min}}, \ldots, \alpha_{l_{max}}$. Based on these representations, equation (1) for the time series of the metric 304 can be rewritten into the following equation.

$$Y_t = Y_{no\text{-}reg,t} + Y_{reg\text{-}only,t} = Y_{no\text{-}reg,t} + \Sigma_{i=l_{min}}^{l_{max}} z_{t-i} \alpha_i \quad (2)$$

The pattern learner 320 then determines a cross correlation of the time series of the metric 304 with the event indicator series z that has been shifted in time by τ. The event indicator series z is therefore a τ shifted event indicator series $Z_{t-\tau}$. These operations therefore transform equation (2) into the following representation.

$$Y_t * z_{t-\tau} = Y_{no\text{-}reg,t} * z_{t-\tau} + \Sigma_{i=l_{min}}^{l_{max}} \alpha_i \cdot z_{t-i} * z_{t-\tau} \quad (3)$$

Based on the assumption that $Y_{no\text{-}reg,t} * Z_{t-\tau} = 0$ for all τ, equation (3) may be rewritten as the following equation.

$$Y_t * z_{t-\tau} = \Sigma_{i=l_{min}}^{l_{max}} \alpha_i \cdot z_{t-i} * z_{t-\tau} \quad (4)$$

In the correlation-based approach, the pattern learner 320 may define a variance for a general time series X as $$\mathrm{Var}[x] = \frac{\sum_i (x_i - \underline{x})^2}{n}.$$

With this representation of variance, the pattern learner 320 may incorporate the variance into equation (4) to result in the following equation.

$$\frac{Y_t * z_{t-\tau}}{\mathrm{Var}[z]} = \Sigma_{i=l_{min}}^{l_{max}} \quad (5)$$

$$\frac{\alpha_i \cdot z_{t-i} * z_{t-\tau}}{\mathrm{Var}[z]} \Rightarrow \frac{Y_t * z_{t-\tau}}{\sqrt{\mathrm{Var}[z]} \cdot \sqrt{\mathrm{Var}[Y_t]}} \cdot \frac{\sqrt{\mathrm{Var}[Y_t]}}{\sqrt{\mathrm{Var}[z]}} = \Sigma_{i=l_{min}}^{l_{max}}$$

$$\frac{\alpha_i \cdot z_{t-i} * z_{t-\tau}}{\sqrt{\mathrm{Var}[z]} \cdot \sqrt{\mathrm{Var}[z]}}$$

By defining $$G = \frac{\sqrt{\mathrm{Var}[Y_t]}}{\sqrt{\mathrm{Var}[z]}}$$

and denoting $\rho_{xy}(\tau)$ as a Pearson correlation between x and a τ index-shifted y, the correlation-based approach generates the following form of equation (5).

$$G \cdot \rho_{Yz}(\tau) = \Sigma_{i=l_{min}}^{l_{max}} \alpha_i \rho_{zz}(i-\tau) \quad (6)$$

Equation (6) may then be represented as the following matrix equation $$G \cdot \vec{\rho}_{Yz} = A \cdot \vec{\alpha} \quad (7)$$

where $A_{ij} = \rho_{zz}(i-\tau)$. The pattern learner 320 can then use this equation (7) to determine α that corresponds to the effect pattern window (i.e., influence pattern 322 for a window lag).

The correlation-based approach is not the only approach that the pattern learner 320 can use determine the influence pattern 322 for an event group 312. In some implementations, the pattern learner 320 uses an approximate L1 minimization approach. The approximate L1 minimization may be referred to as a weighted L2 minimization because each squared difference in the L2 minimization is multiplied by a weight that is divided by the absolute difference from the previous iteration of calculated parameters. This minimization approach is configured to learn the general shape of the influence pattern 322 for an event group 312 (also referred to as the effect shape) and also the amplitude distribution for the influence pattern 322 of the event group 312 (also referred to as the amplitude). In this approach, the pattern learner 320 makes a general assumption that the time series of the metric 304 is composed of a seasonality component, a trend component, a level component, and a regressor effects component. Based on this assumption, the seasonality, trend, and level components may be removed to isolate the regressor effects for the time series of the metric 304, which may be denoted as y_reg.

The pattern learner 320 minimizes the approximate L1 distance between y_reg and a constructed time series. Here, the constructed time series has parameters that indicate the shape of the influence pattern 322 and the amplitude of the influence pattern 322 at each event of the event group 312 (i.e., at each instance 302 of an event). The pattern learner 320 differentiates the approximated L1 distance and can equate the differentiated distance to zero to derive a first equation for the parameters that indicate the shape of the influence pattern 322 and a second equation for the parameters that indicate the amplitude of the influence pattern 322. The pattern learner 320 is capable of performing an iterative process to determine the parameters of each equation (e.g., the first equation and the second equation) for each event instance 302 in the event group 312. When the parameters converge to a stable solution, that solution indicates the shape of the pattern effect 322 and the amplitude of the pattern effect 322 for each event time (i.e., each event time step).

FIG. 5D is an example of this iterative process for the weighted L2 minimization. Here, in this approach, the first iteration assumes an influence window of a particular preset/preconfigured size for the event instance 302. As shown in FIG. 5D, each iteration thereafter changes the parameters for the minimization equation such that the shape of the influence pattern 322 over each iteration approaches the shape and the amplitude of the time series metric 304 during the event instance 302. For example, as shown in FIG. 5D, the first iteration (iteration 1) starts to assume the shape of the influence pattern 322, but not the amplitude. Then, the second iteration (iteration 2) builds on the first iteration to refine the shape and form a more closely fitting amplitude to the behavior of the metric 304 during the event instance 302 than the first iteration. In the final iteration of this example, the fourth iteration (iteration 4), both the shape and the amplitude closely resemble the behavior of the metric 304 during the event instance 302. In other words, at the fourth iteration, the parameters of the optimization have converged to a stable solution that indicates the shape of the pattern effect 322 and the amplitude of the pattern effect 322 for each event time (i.e., each event time step).

In some configurations, the pattern learner 320 starts with L2 minimization. Here, the pattern learner 320 deducts all non-regressor-related components (e.g., the seasonality, the trend, and the level) from the time series for the metric 304. For instance, the pattern learner 320 imputes the time series at the event instances 302 using holt winters smoothing and a season component when a season component exists. With the time series of the metric 304 reduced to regressor components forming a residual time series, the pattern learner 320 minimizes this residual time series represented by the following equation:

$$L = \Sigma_k \Sigma_{i=i_{min}}^{i_{max}} (y_{k+i} - c_k \cdot \alpha_i)^2 \quad (8)$$

where c corresponds to amplitudes for the event instances 302 of the event group 312 and $\alpha_i$ are the effect shape coefficients. By taking the derivative of equation (8) and equating that derivative to zero, the pattern learner 320 generates equation (9) and equation (10) shown below for the amplitude parameters and the effect shape parameters.

$$c_k = \frac{\sum_i y_{k+i} \cdot \alpha_i}{\sum_i \alpha_i^2} \quad (9)$$

$$\alpha_i = \frac{\sum_k y_{k+i} c_k}{\sum_k c_k^2} \quad (10)$$

With both of these equations (9) and (10), the pattern learner 320 can perform alternating iterations. In other words, the pattern learner 320 first determines the c parameters according to a prior iteration of alpha parameters. The pattern learner 320 then determines new alpha parameters with the last iteration of c parameters. The pattern learner 320 finalizes the values of both the c parameters and the alpha parameters when convergence occurs. In some examples, to initialize this alternating iterative process, the pattern learner 320 begins with c=1 for all c parameters and an average over the event window for all events 302 of the event group 312 resulting in $$\alpha_i = \frac{\sum_k y_{k+i}}{k}.$$

In some implementations, in order to approximate L1 minimization, the pattern learner 320 identifies the parameters (e.g., c and/or alpha) from a previous iteration and divides an L2 distance by an absolute value of the previous iteration distance. The following equation represents this minimization with the iteration time as a superscript t.

$$L^t = \sum_k \sum_{i=i_{min}}^{i_{max}} \frac{(y_{k+i} - c_k^t \cdot \alpha_i^t)^2}{|y_{k+i} - c_k^{t-1} \cdot \alpha_i^{t-1}|} \quad (11)$$

With this equation (11), the pattern learner 320 may denote $$w_{ki}^t = \frac{1}{|y_{k+i} - c_k^{t-1} \cdot \alpha_i^{t-1}|},$$

determine the derivative of equation (11) and set that derivative equal to zero to generate alternative versions of equations (9) and (10) for the parameters. The alternative versions of equations (9) and (10) are represented by the following equations:

$$c_k^t = \frac{\sum_i y_{k+i} \cdot \alpha_i^{t-1} \cdot w_{ik}^t}{\sum_i \alpha_i^{t-1^2}} \quad (12)$$

$$\alpha_i^t = \frac{\sum_k y_{k+i} c_k^t \cdot w_{ik}^t}{\sum_k c_k^{t^2}} \quad (13)$$

In some examples, the pattern learner 320 returns each of the event groups 312 to the grouper 310 along with the influence pattern 322 that corresponds to each event group 312. In yet other examples, the pattern learner 320 instead relays the event groups 312 and their corresponding influence patterns 322 to the clusterer 330. In either way, the clusterer 330 receives the event groups 312 and the influence pattern 322 corresponding to each event group 312 and performs clustering of the event groups 312. The clusterer 330 clusters the event groups 312 with the purpose to potentially create new groups (i.e., event clusters 332) that share the same influence pattern 322 on the metric 304.

Clustering may have several advantages. First, the clusterer 330 may serve as a type of error correction for the event grouping by the grouper 310. As previously stated, if the grouper 310 groups the event instances 302 based on event attributes 306 and these event attributes 306 have slight variations that cause instances 302 of an event to fall into separate groups 312 (e.g., "New Years" and "New Year"), the clusterer 330, when clustering the event groups 312 by influence pattern 322, would inherently identify that the event instances 302 from two or more different event groups 312 actually correspond to the same event due to their similar influence patterns 322.

The second advantage of clustering is that two different events may have similar influence patterns 322. In this respect, the event instances 302 within a cluster can form a greater number of training samples 308 for the anomaly detection system 200 as to that particular influence pattern 322. For example, instead of learning from an event with a single event instance 302 per year, an event cluster 332 can include multiple events and therefore multiple event instances 302 to learn from in a given year. Clustering may also be informative in some ways because it may not be readily perceivable (e.g., by a person) that two different events actually behave similar with respect to a certain metric 304. For example, one may not anticipate or realize that the event of a New Year's Day holiday behaves in a similar manner to the event of a St. Patrick's Day holiday with respect to a particular metric 304. This may be a valuable insight to provide to an entity who is invested in the behavior of the metric 304.

Figure 6B:
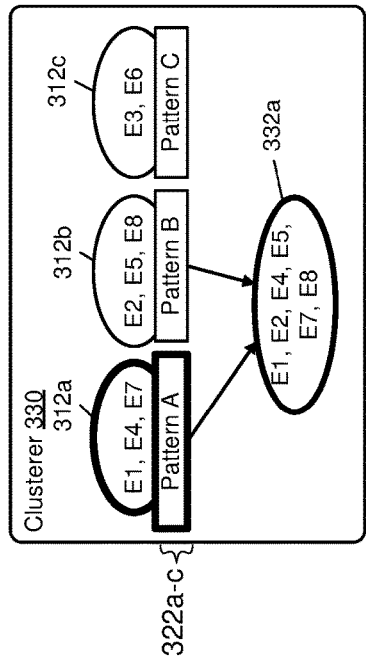
FIGS. 6B and 6C are schematic illustrations of clustering operation consistent with the operations described by FIG. 6A.
Figure 6C:
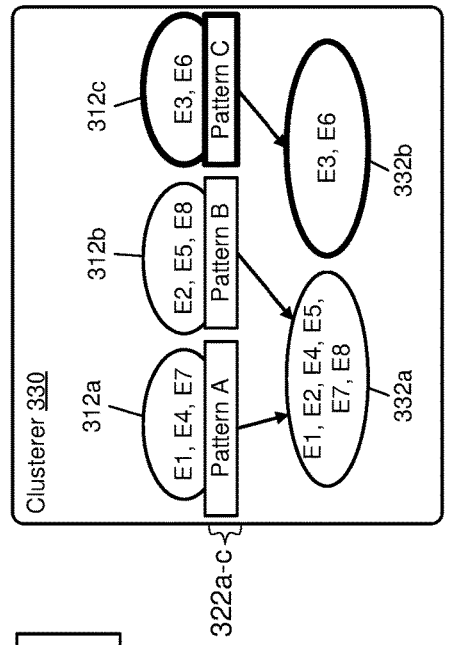
Figure 6A:
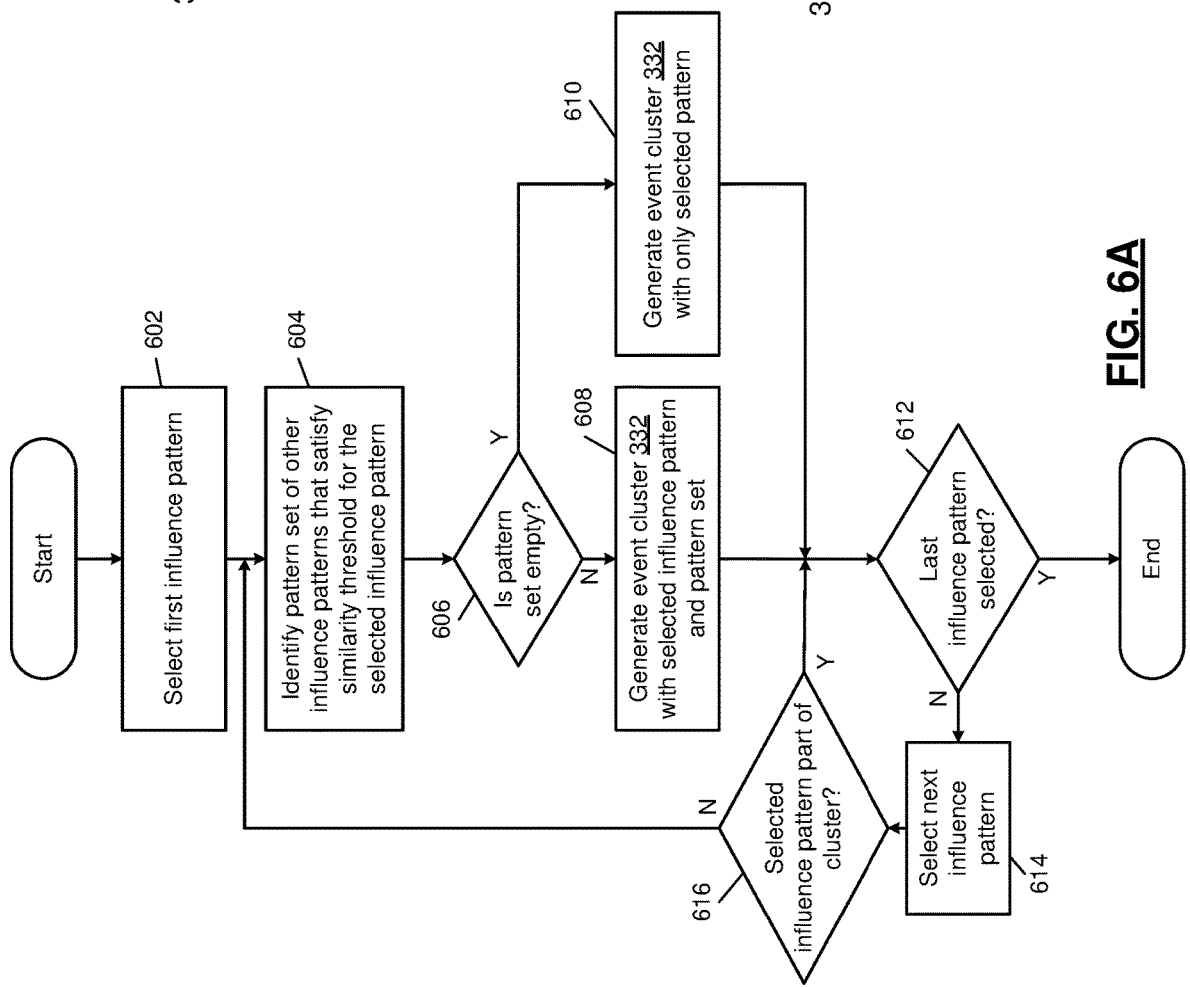
FIG. 6A is a flow diagram of example clustering operation, such as for the event influencer module of FIG. 3.

In some implementations, such as FIGS. 6A-6C, the clusterer 330 clusters a set of received event groups 312 into event clusters 332 based on the influence pattern 322 of each event group 312 such that each event that becomes part of an event cluster 332 shares a similar influence pattern 322. In some examples, to determine whether two or more events 302 share a similar influence pattern 322, the clusterer 330 is configured with a similarity threshold 334. For instance, a similarity threshold 334 identifies the minimum similarity between influence patterns 322 to consider those influence patterns 322 to be functionally similar. The similarity threshold 334 may be setup to consider two or more influence patterns 322 as similar when features of these influence patterns 322 match or are within a particular tolerance of each other. Some examples of features for an influence pattern 322 are the number of non-zero influence coefficients, whether the impact is casual, anti-casual, or both, gain, variability, and any other shape based feature(s).

As shown in FIG. 6A, the clusterer 330 performs a clustering process for each event group 312. At 602, the clusterer 330 selects a first influence pattern 322a as shown by the blackened outline around the first influence patterns 322a of the first event group 312a in FIG. 6B. At 604, the clusterer 30 identifies a pattern set of other influence patterns 322 that satisfy the similarity threshold 334. In other words, the clusterer 330 determines whether a respective influence pattern 322 for an event group 312 satisfies the similarity threshold 334 with one or more other influence patterns 322 of other group event(s) 312 in the set of event groups 312.

As illustrated in FIG. 6B, the clusterer 330 determines that the second influence pattern 322b associated with the second event group 312b satisfies the similarity threshold 334 with respect to the selected influence pattern 322 of the first event group 312a. At 606, the clusterer 330 determines whether the pattern set is empty or not. At 608, in response to the pattern set not being empty (i.e., including one or more influence patterns 322 that satisfy the similarity threshold 334 with the selected influence pattern 322), the clusterer 330 generates an event cluster 332 with the event instances 302 associated with the selected influence pattern 322 (e.g., shown in FIG. 6B as the first influence pattern 322a) and event instances 302 associated with any other influence patterns 322 that satisfy the similarity threshold with the selected pattern 322 (e.g., shown as the second influence pattern 322b in FIG. 6B). In this sense, the clusterer 330 merges the event groups 312 together such that an event cluster 332 includes all events 302 of each group 312 clustered together.

At 610, in response to the pattern set being empty (i.e., no other influence patterns 322 satisfy the similarity threshold 334 with the selected influence pattern 322, the clusterer 330 generates an event cluster 332 with only the event instances 302 associated with the selected influence pattern 322. For instance, FIG. 6C depicts the selected influence pattern 322 as corresponding to the third influence pattern 322c of the third event group 312c. Here, no other influence pattern 322 satisfies the similarity threshold 334 with the third influence pattern 322c. The clusterer 330 therefore generates a second event cluster 332b that includes only the event instances 302 associated with the third event group 312c; essentially maintaining the third event group 312c and not merging it with any other event group 312.

As shown by the clustering process of FIG. 6A, the clustering process occurs for each event group 312. Therefore, at 612, the clusterer 330 determines whether the last influence pattern 322 has been selected. For example, when the third influence pattern 322c in FIG. 6C has been selected and clustered, there are no remaining influence patterns 322 to select and the clustering process ends. On the other hand, in FIG. 6B if the selected influence pattern was the first influence pattern 322a, there are two other influence patterns remaining 322b-c. Therefore, at 612, the clusterer 330 determines that the last influence pattern 322 has not been selected and selects the next influence pattern 322 from the set of influence patterns at 614.

At 616, the clusterer 330 determines if the selected influence pattern 322 is part of an event cluster 332. For example, if the clusterer 330 selected the second influence pattern 322b of FIGS. 6B and 6C, the second influence pattern 322b has already been clustered with the first influence pattern 322 in the first event cluster 332a. At 616, in response to the clusterer 330 determining that the selected influence pattern 322 is part of an event cluster 332, the clusterer 616 returns to 612. But if at 616 the clusterer 330 instead determines that the selected influence pattern 322 is not part of an event cluster 332, the clusterer 616 returns to 604.

Since event clusters 332 constructively form new event groups, the clusterer 330 may be an iterative process until the event clusters 332 from a particular cluster iteration do not result in any new event clusters 332. To perform an iterative clustering process, the clusterer 330 communicates event clusters 332 to the pattern learner 320. Here, when the pattern learner 320 receives an event cluster 332, the pattern learner 320 generates an influence pattern 322 for the event cluster 332 at the cluster level rather than at the group level. This means that an influence pattern 322 for an event cluster 332 can represent the impact of more than one unique type of event (e.g., New Year's and St. Patrick's Day together).

In this respect, when an iteration of the clusterer 330 fails to form any new clusters 332, the event clusters 332 do not share any similar influence patterns 322 with any other event clusters 332; therefore, at this point, there are no new influence patterns 322 that the pattern learner 320 should generate; completing the iterative process.

Since the event influencer module 300 is a training process for the anomaly detection system 200, the output of the event influencer module 300 is training samples 308 for the anomaly detection system 200. The event influencer module 300 generates these training samples 308 based on one or more event clusters 332. In some implementations, each training sample 308 generated by the event influencer module 300 represents the influence pattern 322 of an event cluster 332 and corresponds to an event from the event cluster 332. In other words, each event cluster 332 includes events 302 that have influence patterns 322 with some degree of similarity to each other. In this respect, the events 302 of an event cluster 332 are considered to share an influence pattern 322. With this being the case, each event in an event cluster 332 may function as a training sample 308 to teach the anomaly detection system 200 the influence pattern 322 of the event cluster 332. For example, FIGS. 6B and 6C depict the first event cluster 332a including six events 302. Each of these six events 302 can be a training sample 308 for the influence pattern 322 of the first event cluster 332a.

Figure 7A:
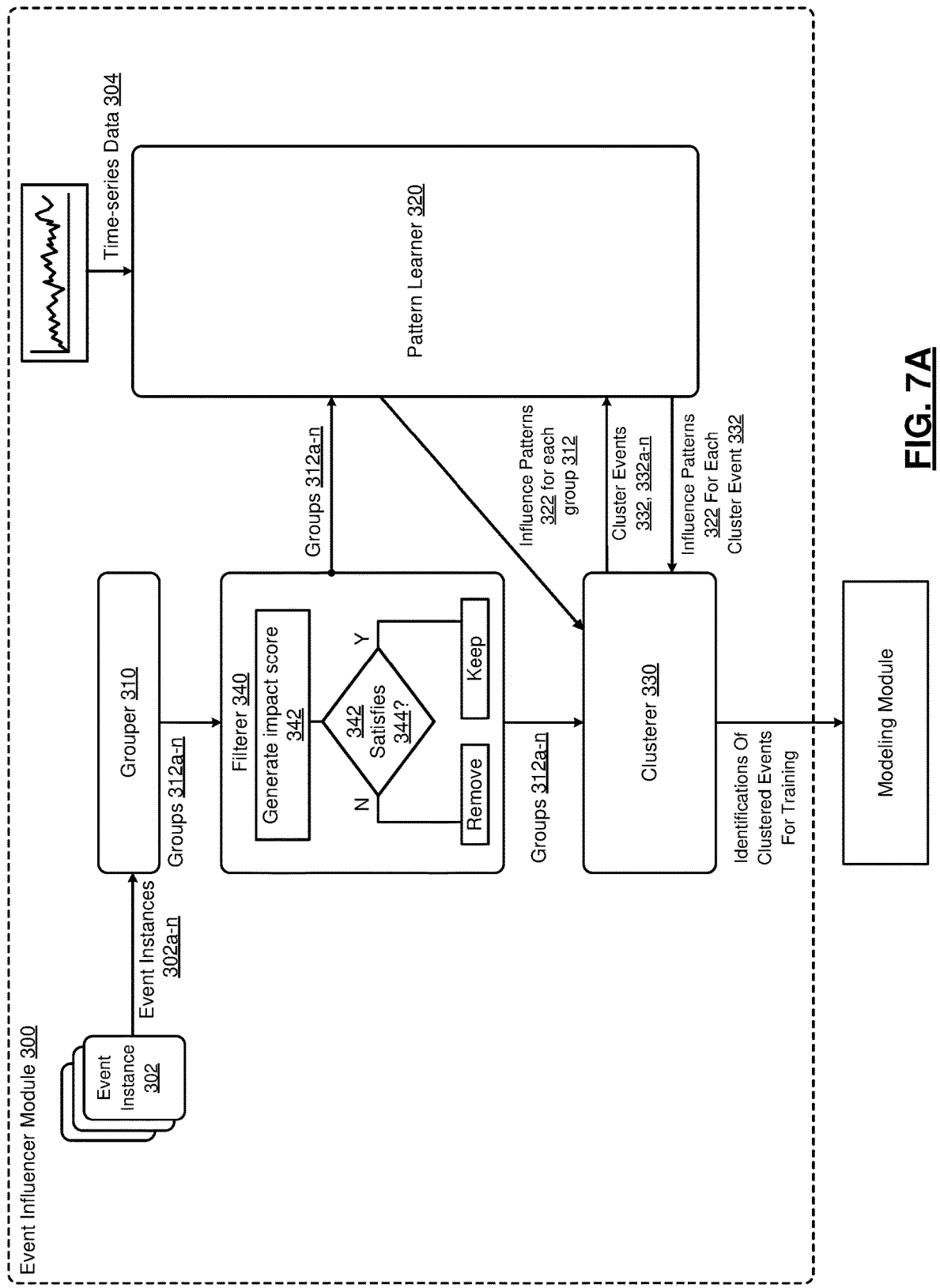
FIGS. 7A and 7B are schematic views of example filterers for the event influencer module of FIG. 3.
Figure 7B:
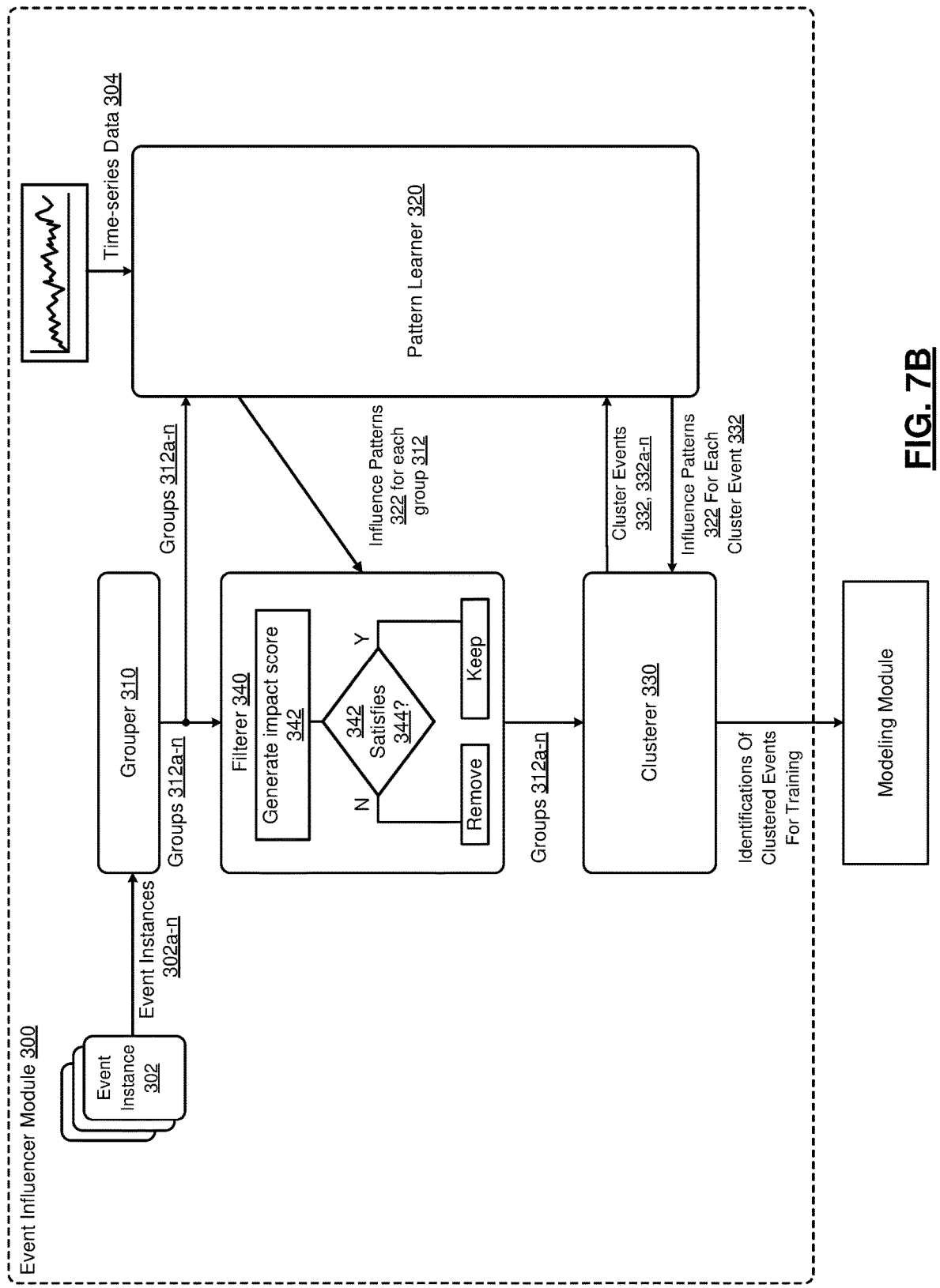

Referring to FIGS. 7A and 7B, the event influencer module 300 may also include a filterer 340 in addition to the grouper 310, the pattern learner 320, and the clusterer 330 as described previously. In some examples, the addition of the filterer 340 modifies the other components of the event influencer module 300 but their functionality remains similar to that described in FIGS. 3-6. In a general sense, the filterer 340 is configured to determine whether an event instance 302 has enough impact on a metric 304. In other words, it may be to the advantage of the event influencer module 300 if the event influencer module 300 avoided processing events that do not significantly impact the metric 304.

With this goal in mind, the filterer 340 employs an impact score algorithm that generates an impact score 342 for an event group 312. Here, the impact score 342 indicates an amount of influence that an event group 312 has on the metric 304. Once the filterer 340 generates the impact score 342 for the event group 312, the filterer 340 determines if the impact score 342 satisfies a filtering threshold 344 that indicates an acceptable amount of influence on the metric 304 by an event group 312. In this respect, an event group 312 may have an influence score 342 that either satisfies the filtering threshold 344 or fails to satisfy the filtering threshold 344. In response to the influence score 342 for an event group 312 satisfying the filtering threshold 344, the filterer 340 passes the event group 312 to another stage of the event influencer module 300 (e.g., to the pattern learner 320 in FIG. 7A or to the clusterer 330 in FIG. 7B).

On the other hand, in response to the influence score 342 for an event group 312 failing to satisfy the filtering threshold 344, the filterer 340 removes the event group 312 with the failing influence score 342 from the set of event groups 312. The filterer 340 may occur at different stages in the event influencer module 300. For example, as shown in FIG. 7A, the event influencer module 300 has the filterer 340 after the grouper 310 (i.e., the formation of event groups 312), but before the pattern learner 320. In other configurations, such as FIG. 7B, the filterer 340 is located after the pattern learner 320, but before the clusterer 330. Accordingly, the placement location of the filterer 340 can impact when the filterer 340 removes an event group 312 that fails to satisfy the filtering threshold 344. That is, when the filterer 340 is after the grouper 310, but before the pattern learner 320, the filterer 340 removes the event group 312 prior to influence pattern generation by the pattern learner 320. Yet when filterer 340 is after the pattern learner 320, but before the clusterer 330, the filterer 340 removes the event group 312 prior to generating event clusters 332.

In some examples, the filtering threshold 344 is a type of fitting quality for the influence pattern 322. For example, after the pattern learner 320 generates the influence pattern 322 for an event group 312 (e.g., using the correlation-based approach or the L1 minimization approach). The filterer 340 operates to determine, at each point in an effect pattern window, the fitting quality of the influence pattern 322 to the metric 304. Here, if the fitting quality satisfies the filtering threshold 344 (e.g., is greater than an acceptable fitting quality), there is an effect/influence at a respective window point. In some implementations, the fitting quality fails to satisfy the filtering threshold 344 when no point within the window satisfies the filtering threshold 344. In response to no point within the window being a satisfactory fit, the filterer 340 discards the event group 312.

To determine the fitting quality, the filterer 340 uses different types of fitting approaches. Two of these approaches are a correlation-based approach and an analysis of variance-based approach (Anova). For a correlation-based approach, the filterer 340 determines the Pearson correlation of each lag shifted event indicator time series (e.g., the new time series) with the original time series for the metric 304. The filterer 340 then generates the impact score 342 (e.g., using a fisher score). The filterer 340 compares the impact score 342 to the filtering threshold 344 to determine whether there is a strong enough correlation for the event group 312. For instance, the filtering threshold 344 is predefined as 0.95 and any impact score 342 greater than this threshold 344 (e.g., >0.95) has a strong correlation to keep the event group 312 (i.e., the event instances 302 of the event group 312) in the training process.

In a variance-based approach, the filterer 340 determines a variance in the data as explained by a calculated effect (or by an average absolute difference) for a particular window lag. The filterer 340 additionally determines the variance (or average absolute difference) in the data that is unexplained by the calculated effect. Here, when the ratio of the explained variance to the unexplained variance has an f distribution, the event group 312 does not have an adequate effect on the metric 304. On the other hand, when the ratio is at a tail of the distribution (e.g., a distribution threshold for the filtering threshold 344), the filterer 340 determines that the event group 312 has an impactful effect at the window lag and keeps the event group 312 in the training process.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in a different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship encompasses a direct relationship where no other intervening elements are present between the first and second elements as well as an indirect relationship where one or more intervening elements are present between the first and second elements.

The phrase "at least one of A, B, and C" should be construed to mean a logical (A OR B OR C), using a non-exclusive logical OR, and should not be construed to mean "at least one of A, at least one of B, and at least one of C." The term "set" does not necessarily exclude the empty set—in other words, in some circumstances a "set" may have zero elements. The term "non-empty set" may be used to indicate exclusion of the empty set—in other words, a non-empty set will always have one or more elements. The term "subset" does not necessarily require a proper subset. In other words, a "subset" of a first set may be coextensive with (equal to) the first set. Further, the term "subset" does not necessarily exclude the empty set—in some circumstances a "subset" may have zero elements.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" can be replaced with the term "controller" or the term "circuit." In this application, the term "controller" can be replaced with the term "module." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); processor hardware (shared, dedicated, or group) that executes code; memory hardware (shared, dedicated, or group) that stores code executed by the processor hardware; other suitable hardware components that provide the described functionality; or a combination of some or all of the above, such as in a system-on-chip.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2020 (also known as the WIFI wireless networking standard) and IEEE Standard 802.3-2018 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

The memory hardware may also store data together with or separate from the code. Shared memory hardware encompasses a single memory device that stores some or all code from multiple modules. One example of shared memory hardware may be level 1 cache on or near a microprocessor die, which may store code from multiple modules. Another example of shared memory hardware may be persistent storage, such as a solid state drive (SSD) or magnetic hard disk drive (HDD), which may store code from multiple modules. Group memory hardware encompasses a memory device that, in combination with other memory devices, stores some or all code from one or more modules. One example of group memory hardware is a storage area network (SAN), which may store code of a particular module across multiple physical devices. Another example of group memory hardware is random access memory of each of a set of servers that, in combination, store code of a particular module.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. Such apparatuses and methods may be described as computerized apparatuses and computerized methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The invention claimed is:

1. A computerized method comprising:
   receiving a plurality of events that occurred during a time series of a target metric, wherein each event of the plurality of events includes an event attribute characterizing the respective event;
   generating a set of event groups for the plurality of events, wherein each event of a respective event group shares a respective event attribute with one or more other events of the respective event group;
   for each respective event group of the set of event groups, determining an influence pattern that identifies an influence of the respective event group on the target metric, wherein determining the influence pattern includes determining a mean expected influence for all events of the respective event group;
   clustering the set of event groups into event clusters based on a respective influence pattern of each respective event group, wherein each event cluster includes one or more event groups that share a similar influence pattern; and
   generating a plurality of training samples for an anomaly detection system based on a respective event cluster.

2. The computerized method of claim 1 wherein each respective training sample represents the respective influence pattern of the respective event cluster and corresponds to an event from the respective event cluster.

3. The computerized method of claim 1 further comprising, for each respective event group:
   generating an impact score for the respective event group, wherein the impact score indicates an amount of influence that the events of the respective event group have on the target metric; and
   determining that the impact score satisfies a filtering threshold, wherein the filtering threshold indicates an acceptable amount of influence on the target metric for a group event.

4. The computerized method of claim 1 further comprising, for each respective event group:
   generating an impact score for the respective event group, wherein the impact score indicates an amount of influence that the events of the respective event group have on the target metric;
   determining that the impact score fails to satisfy a filtering threshold, wherein the filtering threshold indicates an acceptable amount of influence on the target metric for a group event; and
   removing the respective event group from the set of event groups after determining the influence pattern for the respective event group, but prior to clustering the set of event groups into event clusters.

5. The computerized method of claim 1 further comprising, for each respective event group:
   generating an impact score for the respective event group, wherein the impact score indicates an amount of influence that the events of the respective event group have on the target metric;
   determining that the impact score fails to satisfy a filtering threshold, wherein the filtering threshold indicates an acceptable amount of influence on the target metric for a group event; and
   removing the respective event group from the set of event groups prior to determining the influence pattern for the respective event group.

6. The computerized method of claim 1 wherein clustering the set of event groups into the event clusters based on the respective influence pattern includes, for each respective event group:
- determining whether the respective influence pattern of the respective event group satisfies a minimum similarity threshold with a second influence pattern of a second event group in the set of event groups; and
- in response to the respective influence pattern of the respective event group satisfying the minimum similarity threshold with the second influence pattern of the second event group, clustering the respective event group with the second event group in a respective event cluster.

7. The computerized method of claim 1 wherein the event attribute characterizing the respective event is a textual description of the respective event.

8. The computerized method of claim 1 wherein the anomaly detection system is a machine-learning-based anomaly detection system.

9. The computerized method of claim 1 wherein determining the influence pattern that identifies the influence of the respective event group on the target metric includes performing a weighted L2 minimization across a time series representing all events of the respective event group.

10. A system comprising:
- processor hardware; and
- memory hardware in communication with the processor hardware, wherein the memory hardware stores instructions that, when executed by the processor hardware, perform operations, and wherein the operations include:
  - receiving a plurality of events that occurred during a time series of a target metric, wherein each respective event of the plurality of events includes an event attribute characterizing the respective event;
  - generating a set of event groups for the plurality of events, wherein each event of a respective event group shares a respective event attribute with one or more other events of the respective event group;
  - for each respective event group of the set of event groups, determining an influence pattern that identifies an influence of the respective event group on the target metric, wherein determining the influence pattern includes determining a mean expected influence for all events of the respective event group;
  - clustering the set of event groups into event clusters based on a respective influence pattern of each respective event group, wherein each event cluster includes one or more event groups that share a similar influence pattern; and
  - generating a plurality of training samples for an anomaly detection system based on a respective event cluster.

11. The system of claim 10 wherein each respective training sample represents the respective influence pattern of the respective event cluster and corresponds to an event from the respective event cluster.

12. The system of claim 10 wherein the operations include, for each respective event group:
- generating an impact score for the respective event group, wherein the impact score indicates an amount of influence that the events of the respective event group have on the target metric; and
- determining that the impact score satisfies a filtering threshold, wherein the filtering threshold indicates an acceptable amount of influence on the target metric for a group event.

13. The system of claim 10 wherein the operations include, for each respective event group:
- generating an impact score for the respective event group, wherein the impact score indicates an amount of influence that the events of the respective event group have on the target metric;
- determining that the impact score fails to satisfy a filtering threshold, wherein the filtering threshold indicates an acceptable amount of influence on the target metric for a group event; and
- removing the respective event group from the set of event groups after determining the influence pattern for the respective event group, but prior to clustering the set of event groups into event clusters.

14. The system of claim 10 wherein the operations include, for each respective event group:
- generating an impact score for the respective event group, wherein the impact score indicates an amount of influence that the events of the respective event group have on the target metric;
- determining that the impact score fails to satisfy a filtering threshold, wherein the filtering threshold indicates an acceptable amount of influence on the target metric for a group event; and
- removing the respective event group from the set of event groups prior to determining the influence pattern for the respective event group.

15. The system of claim 10 wherein clustering the set of event groups into the event clusters based on the respective influence pattern includes for each respective event group:
- determining whether the respective influence pattern of the respective event group satisfies a minimum similarity threshold with a second influence pattern of a second event group in the set of event groups; and
- in response to the respective influence pattern of the respective event group satisfying the minimum similarity threshold with the second influence pattern of the second event group, clustering the respective event group with the second event group in a respective event cluster.

16. The system of claim 10 wherein the event attribute characterizing the respective event is a textual description of the respective event.

17. The system of claim 10 wherein the anomaly detection system is a machine learning-based anomaly detection system.

18. The system of claim 10 wherein determining the influence pattern that identifies the influence of the respective event group on the target metric includes performing a weighted L2 minimization across a time series representing all events of the respective event group.

* * * * *